US008207913B2

(12) United States Patent
Ibaraki et al.

(10) Patent No.: US 8,207,913 B2

(45) Date of Patent: Jun. 26, 2012

(54) PLASMA DISPLAY DEVICE AND METHOD FOR CONTROLLING AN AMPLITUDE OF A WAVEFORM USED FOR DRIVING A PLASMA DISPLAY PANEL BASED ON TEMPERATURE

(75) Inventors: Hiroshi Ibaraki, Osaka (JP); Minoru Takeda, Osaka (JP); Keiji Akamatsu, Osaka (JP); Kenji Ogawa, Osaka (JP); Nobuhiko Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 184 days.

(21) Appl. No.: 12/301,097

(22) PCT Filed: Apr. 23, 2008

(86) PCT No.: PCT/JP2008/001059

§ 371 (c)(1),
(2), (4) Date: Nov. 17, 2008

(87) PCT Pub. No.: WO2008/132840

PCT Pub. Date: Nov. 6, 2008

(65) Prior Publication Data

US 2010/0039415 A1 Feb. 18, 2010

(30) Foreign Application Priority Data

Apr. 25, 2007 (JP) ................................. 2007-115183

(51) Int. Cl.
*G09G 3/28* (2006.01)
*G09G 5/00* (2006.01)
*G06F 3/038* (2006.01)

(52) U.S. Cl. .......................................... 345/60; 345/208

(58) Field of Classification Search .............. 345/60–72, 345/208, 210–215; 315/169.4
See application file for complete search history.

(56) References Cited

U.S. PATENT DOCUMENTS 8,026,869 B2 9/2011 Takagi
2004/0021656 A1 * 2/2004 Kang et al. .................... 345/204
(Continued)

FOREIGN PATENT DOCUMENTS

JP 2000-242224 A 9/2000
(Continued)

OTHER PUBLICATIONS

South Korea Office Action for Application No. 10-2009-7001967, Sep. 16, 2010, Panasonic Corporation.

(Continued)

*Primary Examiner* — Chanh Nguyen
*Assistant Examiner* — Navin Lingaraju
(74) *Attorney, Agent, or Firm* — RatnerPrestia

(57) ABSTRACT

A plasma display panel; a scan electrode drive circuit for generating a gently decreasing downward inclined waveform voltage in an initializing period, a gently increasing first inclined waveform voltage, and a second inclined waveform voltage having a steeper gradient than the first inclined waveform voltage and decreasing immediately after the increasing waveform voltage reaches a predetermined potential in the last part of the sustain period. The lowest voltage in the downward inclined waveform voltage is switched at a first voltage, a second voltage higher than the first voltage and a third voltage higher than the second voltage to generate a downward inclined waveform voltage. The lowest voltage is switched according to the detected temperature to generate the downward inclined waveform voltage.

4 Claims, 16 Drawing Sheets

U.S. PATENT DOCUMENTS

| | | | | |
|---|---|---|---|---|
| 2005/0110713 | A1* | 5/2005 | Chung et al. | 345/60 |
| 2006/0187147 | A1* | 8/2006 | Jeong | 345/63 |
| 2007/0069983 | A1* | 3/2007 | Choi | 345/60 |
| 2008/0204442 | A1* | 8/2008 | Choi | 345/211 |
| 2008/0259001 | A1* | 10/2008 | Kim et al. | 345/60 |
| 2009/0079726 | A1 | 3/2009 | Takagi et al. | |
| 2009/0085835 | A1* | 4/2009 | Park et al. | 345/60 |
| 2009/0122042 | A1 | 5/2009 | Origuchi | |

FOREIGN PATENT DOCUMENTS

| | | | |
|---|---|---|---|
| JP | 2006-235598 | A | 9/2006 |
| JP | 2007-333840 | A | 12/2007 |
| JP | 2008268795 | A | 11/2008 |
| JP | 4530047 | B2 | 8/2010 |
| KR | 10-2006-0062701 | | 6/2006 |
| WO | WO 2006/137118 | A1 | 12/2006 |
| WO | WO-2006137118 | A1 | 12/2006 |
| WO | WO 2007/099903 | A1 | 9/2007 |
| WO | WO 2007/099904 | A1 | 9/2007 |
| WO | WO 2008/018370 | A1 | 2/2008 |

OTHER PUBLICATIONS

Japanese International Search Report for PCT/JP2008/001059, Apr. 25, 2007.

* cited by examiner

PLASMA DISPLAY DEVICE AND METHOD FOR CONTROLLING AN AMPLITUDE OF A WAVEFORM USED FOR DRIVING A PLASMA DISPLAY PANEL BASED ON TEMPERATURE

This application is a U.S. national Phase Application of PCT International Application PCT/JP2008/001059.

TECHNICAL FIELD

The present invention relates to a plasma display device used in a wall-mounted television and a large-size monitor and to a method for driving a plasma display panel.

BACKGROUND ART

An AC surface discharge panel as a typical plasma display panel (hereinafter, abbreviated as a "panel") includes a front panel and a rear panel disposed facing each other with a large number of discharge cells provided therebetween. The front panel has a plurality of display electrode pairs, each composed of a pair of scan electrode and sustain electrode, formed in parallel to each other on a glass front substrate. A dielectric layer and a protective layer are formed so as to cover the display electrode pairs. The rear panel includes a plurality of data electrodes formed in parallel to each other on a rear glass substrate, a dielectric layer formed so as to cover the data electrodes, a plurality of barrier ribs formed in parallel to the data electrodes on the dielectric layer. A phosphor layer is formed on the top surface of the dielectric layer and the side surface of the barrier ribs. The front panel and the rear panel are disposed facing each other so that the display electrode pairs three-dimensionally intersect with the data electrodes, and sealed to each other. The discharge space inside thereof is filled with a discharge gas including, for example, xenon at the partial pressure ratio of 5%. Herein, a discharge cell is formed in a portion where the display electrode pair and the data electrode face each other. In a panel having such a configuration, ultraviolet light is generated by gas discharge in each discharge cell, and this ultraviolet light excites phosphor layers for red (R), green (G) and blue (B) to cause light emission for color display.

As a method for driving a panel, a subfield method is generally employed. The subfield method divides one field period into a plurality of subfields, and carries out gradation display by a combination of subfields to emit light.

Each subfield includes an initializing period, an address period, and a sustain period. In the initializing period, initializing discharge is generated to form wall charge necessary for a subsequent address operation on each electrode, and priming particles (priming for discharge=excited particles) for stably causing address discharge are generated. In the address period, an address pulse voltage is selectively applied to a discharge cell to be displayed so as to cause address discharge, thus forming wall charge (hereinafter, this operation is also referred to as "address"). In the sustain period, a sustain pulse voltage is applied alternately to the display electrode pair composed of the scan electrode and the sustain electrode so as to cause sustain discharge in a discharge cell in which address discharge has been generated. Thus, a phosphor layer of the corresponding discharge cell is allowed to emit light so as to carry out an image display.

Furthermore, among the subfield methods, there is disclosed a driving method of causing initializing discharge by using a gently changing voltage waveform, further selectively causing initializing discharge with respect to a discharge cell in which sustain discharge has been generated, and thereby reducing light emission that is not related to the gradation display as much as possible to improve a contrast ratio.

Specifically, an all-cell initializing operation for causing initializing discharge in all discharge cells is carried out in the initializing period of one subfield in the plurality of subfields, and a selective initializing operation for causing initializing discharge only in a discharge cell in which sustain discharge has been carried out in the immediately preceding sustain period is carried out in the initializing period of the other subfields. With such driving, brightness in a black display region (hereinafter, abbreviated as "black brightness") changing depending on light emission that is not related to an image display is only feeble light emission in the all-cell initializing operation. Thus, an image display with a high contrast becomes possible (see, for example, patent document 1).

Furthermore, the above-mentioned patent document 1 also discloses so-called narrow width erase discharge in which the pulse width of the last sustain pulse in the sustain period is made to be shorter than the pulse width of other sustain pulses so as to relieve the potential difference by wall charge between the display electrode pairs. This narrow width erase discharge can stabilize an address operation in an address period in the subsequent subfield, and thus, a plasma display device with a high contrast ratio can be realized.

Recently, a panel with higher resolution has been developed. In the panel with higher resolution, since the number electrodes to be formed in the panel increase, the pulse width of an address pulse voltage must be shortened in order not to increase the time necessary for addressing. Thus, address may be unstable.

With trend toward high resolution of a panel, a discharge cell is becoming finer. It is confirmed that, in the finer discharge cells, a phenomenon called charge drop off in which wall charge is lost easily occurs. When the charge drop off occurs, discharge failure occurs, thus deteriorating the quality of image display or increasing the applied voltage necessary to cause discharge.

One of the main reasons of the charge drop off is discharge variation at the time of address operation. For example, when the discharge variation at the time of the address operation is large and strong address discharge is generated, in a place where a discharge cell to emit light and a discharge cell that does not emit light are adjacent to each other, the discharge cell to emit light may deprive wall charge from the discharge cell that does not emit light, which may lead to the charge drop off. Therefore, it is important to generate address discharge as stably as possible in order to prevent the charge drop off.

[Patent document 1] Japanese Patent Application Unexamined Publication No. 2000-242224

SUMMARY OF THE INVENTION

A plasma display device of the present invention includes a panel including a plurality of discharge cells, each having a display electrode pair composed of a scan electrode and a sustain electrode; a scan electrode drive circuit for driving the scan electrode by generating a gently decreasing downward inclined waveform voltage in an initializing period of the plurality of subfields in one field period, each of the subfields having the initialization period, an address period and a sustain period, and by generating a gently increasing first inclined waveform voltage in the initializing period of at least one subfield in the one field period; and a panel temperature detecting circuit having a thermal sensor and detecting a temperature of the panel. The scan electrode drive circuit switches a lowest voltage in the downward inclined waveform voltage at a first voltage, a second voltage having a higher voltage value than the first voltage and a third voltage having a higher voltage value than the second voltage to generate the downward inclined waveform voltage, and switches the lowest voltage according to the temperature detected by the panel temperature detecting circuit. Thus, the downward inclined waveform voltage is generated.

Thus, even in a panel having a higher resolution, address discharge can be generated stably without increasing the voltage necessary to cause address discharge, and the quality of image display can be improved.

Furthermore, in this plasma display device, the panel temperature detecting circuit compares the detected temperature with a predetermined low-temperature threshold value and a predetermined high-temperature threshold value. Then, the scan electrode drive circuit sets the lowest voltage to the third voltage and generates the downward inclined waveform voltage when the temperature detected by the panel temperature detecting circuit is determined to be not less than the high-temperature threshold value; the scan electrode drive circuit sets the lowest voltage to the first voltage and generates the downward inclined waveform voltage when the temperature detected by the panel temperature detecting circuit is determined to be less than the low-temperature threshold value; and the scan electrode drive circuit sets the lowest voltage to the second voltage and generates the downward inclined waveform voltage when the temperature detected by the panel temperature detecting circuit is determined to be not less than the low-temperature threshold value and less than the high-temperature threshold value. Thus, address discharge can be generated stably and the quality of image display of the panel can be improved.

Furthermore, in this plasma display device, the scan electrode drive circuit may set the lowest voltage to the third voltage and generate the downward inclined waveform voltage in a subfield in which a total number of sustain pulses in the sustain period in an immediately preceding subfield is not less than a predetermined value when the temperature detected by the panel temperature detecting circuit is determined to be not less than the high-temperature threshold value. Thus, address discharge can be generated further stably, and the quality of image display of the panel can be further improved.

Furthermore, in this plasma display device, the scan electrode drive circuit may set the lowest voltage to the second voltage and generate the downward inclined waveform voltage in the subfield in which the first inclined waveform voltage is generated. Thus, the address discharge can be generated further stably.

Furthermore, a method for driving a panel of the present invention is a method for driving a panel provided with a plurality of discharge cells including a display electrode pair composed of a scan electrode and a sustain electrode. One field period includes a plurality of subfields each including an initializing period, an address period and a sustain period. A gently decreasing downward inclined waveform voltage is generated in the initializing period, and a gently increasing first inclined waveform voltage is generated in the initializing period of at least one subfield in one field period, and they are applied to the scan electrode. The downward inclined waveform voltage is generated by switching the lowest voltage in the downward inclined voltage at a first voltage, a second voltage having a higher voltage value than the first voltage and a third voltage having a higher voltage value than the second voltage. A temperature of the plasma display panel is detected by using a thermal sensor, and the lowest voltage in the downward inclined waveform voltage is switched according to the detected temperature.

Thus, even in a panel having a higher resolution, address discharge can be generated stably without increasing the voltage necessary to cause address discharge, and the quality of image display can be improved.

In the method for driving a panel of the present invention, the detected temperature is compared with a predetermined low-temperature threshold value and a high-temperature threshold value. When the detected temperature is not less than the high-temperature threshold value, the lowest voltage is set to the third voltage to generate a downward inclined waveform voltage; when the temperature is less than the low-temperature threshold value, the lowest voltage is set to the first voltage to generate a downward inclined waveform voltage; and when the detected temperature is not less than the low-temperature threshold value and less than the high-temperature threshold value, the lowest voltage is set to the second voltage to generate a downward inclined waveform voltage. Thus, address discharge can be generated stably, and the quality of image display can be improved.

Furthermore, in the method for driving a panel of the present invention, when the temperature is not less than the high-temperature threshold value, the lowest voltage may be set to the third voltage to generate a downward inclined waveform voltage in a subfield in which a total number of sustain pulses in the sustain period in an immediately preceding subfield is not less than a predetermined value. Thus, address discharge can be generated further stably, and the quality of image display can be further improved.

Furthermore, in the method for driving a panel of the present invention, the lowest voltage may be set to the second voltage to generate a downward inclined waveform voltage in the subfield in which the first inclined waveform voltage is applied to the scan electrode. Thus, address discharge can be generated stably, and the quality of image display can be improved.

REFERENCE MARKS IN THE DRAWINGS

Figure 1:
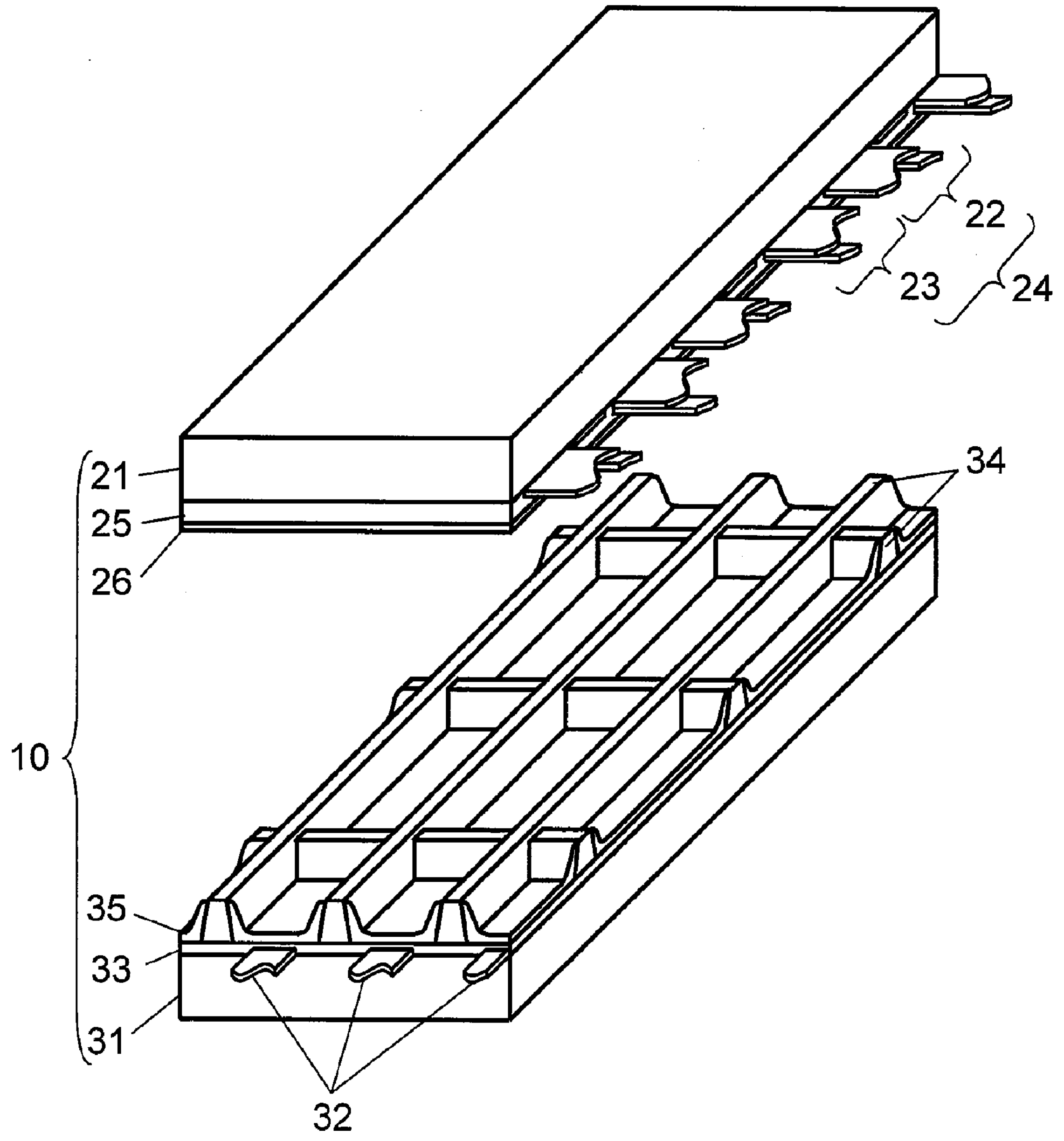
FIG. 1 is an exploded perspective view showing a structure of a panel in accordance with a first exemplary embodiment of the present invention.

1 plasma display device
10 panel
21 (glass) front panel
22 scan electrode
23 sustain electrode
24 display electrode pair
25, 33 dielectric layer
26 protective layer
31 rear panel
32 data electrode
34 barrier rib
35 phosphor layer
41 image signal processing circuit
42 data electrode drive circuit
43 scan electrode drive circuit
44 sustain electrode drive circuit
45 timing generating circuit
46 panel temperature detecting circuit
47 thermal sensor
50, 60 sustain pulse generating circuit
51, 61 power recovery circuit
52, 62 clamping circuit
53 initializing waveform generating circuit
54 scan pulse generating circuit
55 first Miller integrating circuit
56 second Miller integrating circuit
57 third Miller integrating circuit
Q1, Q2, Q3, Q4, Q11, Q13, Q14, Q15, Q16, Q21, Q31, Q32, Q33, Q34, Q36, Q37, Q38, Q39, QH1-QHn, QL1-QLn switching element
C1, C10, C11, C12, C21, C30, C31 capacitor
L1, L30 inductor
D1, D2, D12, D13, D21, D22, D23, D24, D31, D32, D33 diode
AG AND gate
CP comparator
PC photo-coupler
R10, R11, R12, R13, R14 resistor

DETAILED DESCRIPTION OF THE PREFERRED EMBODIMENTS

Hereinafter, a plasma display device in accordance with exemplary embodiments of the present invention is described with reference to drawings.

First Exemplary Embodiment

FIG. 1 is an exploded perspective view showing a structure of panel 10 in accordance with the first exemplary embodiment of the present invention. A plurality of display electrode pairs 24 each composed of scan electrode 22 and sustain electrode 23 are formed on glass front panel 21. Dielectric layer 25 is formed so as to cover scan electrode 22 and sustain electrode 23. Protective layer 26 is formed on dielectric layer 25.

Furthermore, protective layer 26 is made of a material containing MgO as a main component, which has been used as a panel material in order to reduce a discharge start voltage in the discharge cell, has a large secondary electron emission coefficient when neon (Ne) and xenon (Xe) gasses are filled and is excellent in durability.

A plurality of data electrodes 32 are formed on rear panel 31, dielectric layer 33 is formed so as to cover data electrodes 32, and further double-cross-shaped barrier ribs 34 are formed on dielectric layer 33. Phosphor layer 35 emitting red (R), green (G) and blue (B) light is provided on the side surface of barrier ribs 34 and on the top surface of dielectric layer 33.

Front panel 21 and rear panel 31 are disposed facing each other so that display electrode pairs 24 and data electrodes 32 intersect with each other with minute discharge space interposed therebetween. Front panel 21 and rear panel 31 are sealed to each other on the peripheral portions thereof with a sealing agent such as glass frit. A mixture gas including neon and xenon is filled as a discharge gas in the inside of the discharge space. In this exemplary embodiment, in order to improve the light-emitting efficiency, a discharge gas having a partial pressure of xenon of 10% is used. The discharge space is partitioned into a plurality of sections by barrier ribs 34. A discharge cell is formed in a portion where display electrode pair 24 and data electrode 32 intersect with each other. These discharge cells are discharged and emit light, and thereby an image is displayed.

Note here that the structure of panel 10 is not necessarily limited to the above-mentioned structure and, for example, a structure having stripe-shaped barrier ribs may be employed. Furthermore, the mixing ratio of the discharge gasses is not limited to the above-mentioned value and may be another mixing ratio.

Figure 2:
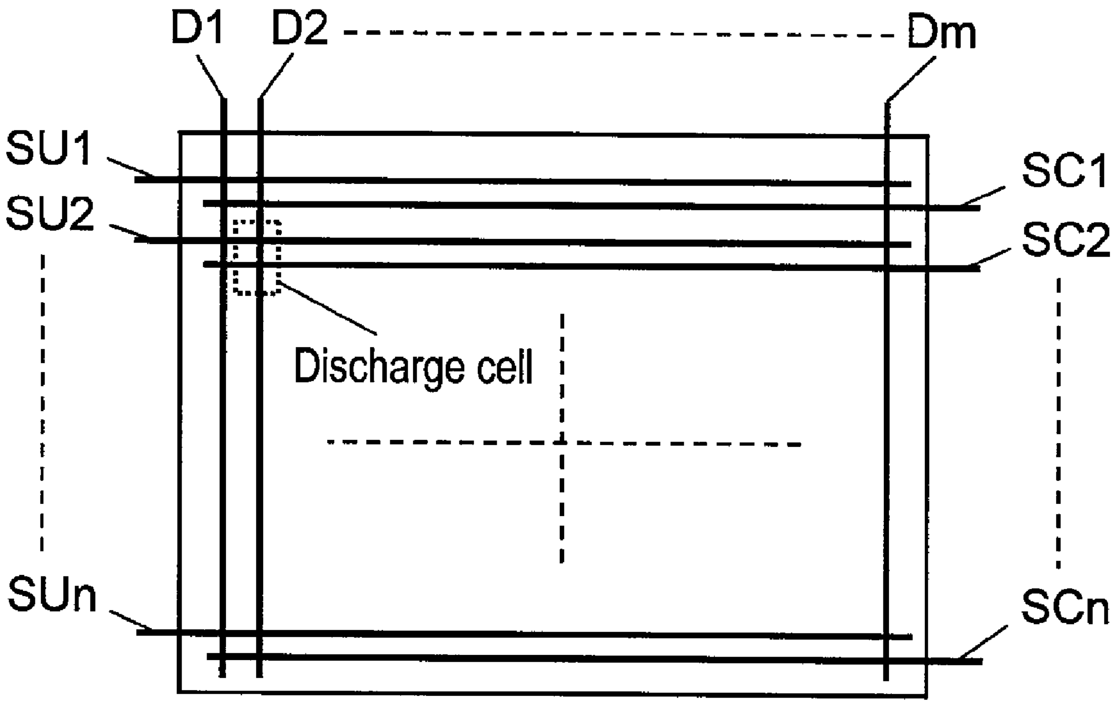
FIG. 2 shows an arrangement of electrodes of the panel.

FIG. 2 shows an arrangement of electrodes of panel 10 in accordance with the first exemplary embodiment of the present invention. On panel 10, n lines of scan electrodes SC1-SCn (scan electrodes 22 in FIG. 1) and n lines of sustain electrodes SU1-SUn (sustain electrodes 23 in FIG. 1), which are long in the row direction, are arranged, as well as m lines of data electrodes D1-Dm (data electrodes 32 in FIG. 1) which are long in the column direction are arranged. A discharge cell is formed in a portion where a pair of scan electrode SCi (i=1 to n) and sustain electrode SUi intersect with one data electrode Dj (j=1 to m). The discharge cells of m×n pieces are formed in discharge space. As shown in FIGS. 1 and 2, since scan electrode SCi and sustain electrode SUi are arranged in parallel to each other so as to form a pair, large interelectrode capacitance Cp exists between scan electrodes SC1-SCn and sustain electrodes SU1-SUn.

Next, a drive voltage waveform for driving panel 10 and the outline of its operation are described. The plasma display device in this exemplary embodiment carries out gradation display by a subfield method, in which one field period is divided into plural subfields, and light emission/non-emission of each discharge cell is controlled for every subfield. Each subfield includes an initializing period, an address period, and a sustain period.

In each subfield, in the initializing period, initializing discharge is generated so as to form wall charge necessary for the subsequent address discharge on each electrode. In addition, priming particles (priming for discharge=excited particles) for reducing discharge delay and causing address discharge stably are generated. The initializing operation at this time includes an all-cell initializing operation for causing initializing discharge in all discharge cells, and a selective initializing operation for causing initializing discharge selectively in only a discharge cell in which sustain discharge has been carried out in the immediately preceding subfield.

In the address period, address discharge is generated selectively so as to form wall charge in a discharge cell to emit light in the subsequent sustain period. Then, in the sustain period, sustain pulses of the number proportional to a brightness weight are alternately applied to display electrode pair 24 so as to cause sustain discharge to emit light in a discharge cell in which address discharge has been generated. The proportional constant at this time is referred to as "brightness magnification."

Note here that in this exemplary embodiment, an inclined waveform voltage is generated in the last part of the sustain period, thus stabilizing an address operation in the address period of the subsequent subfield. Hereinafter, firstly, an outline of the drive voltage waveform is described, and then a configuration of the drive circuit is described.

Figure 3:
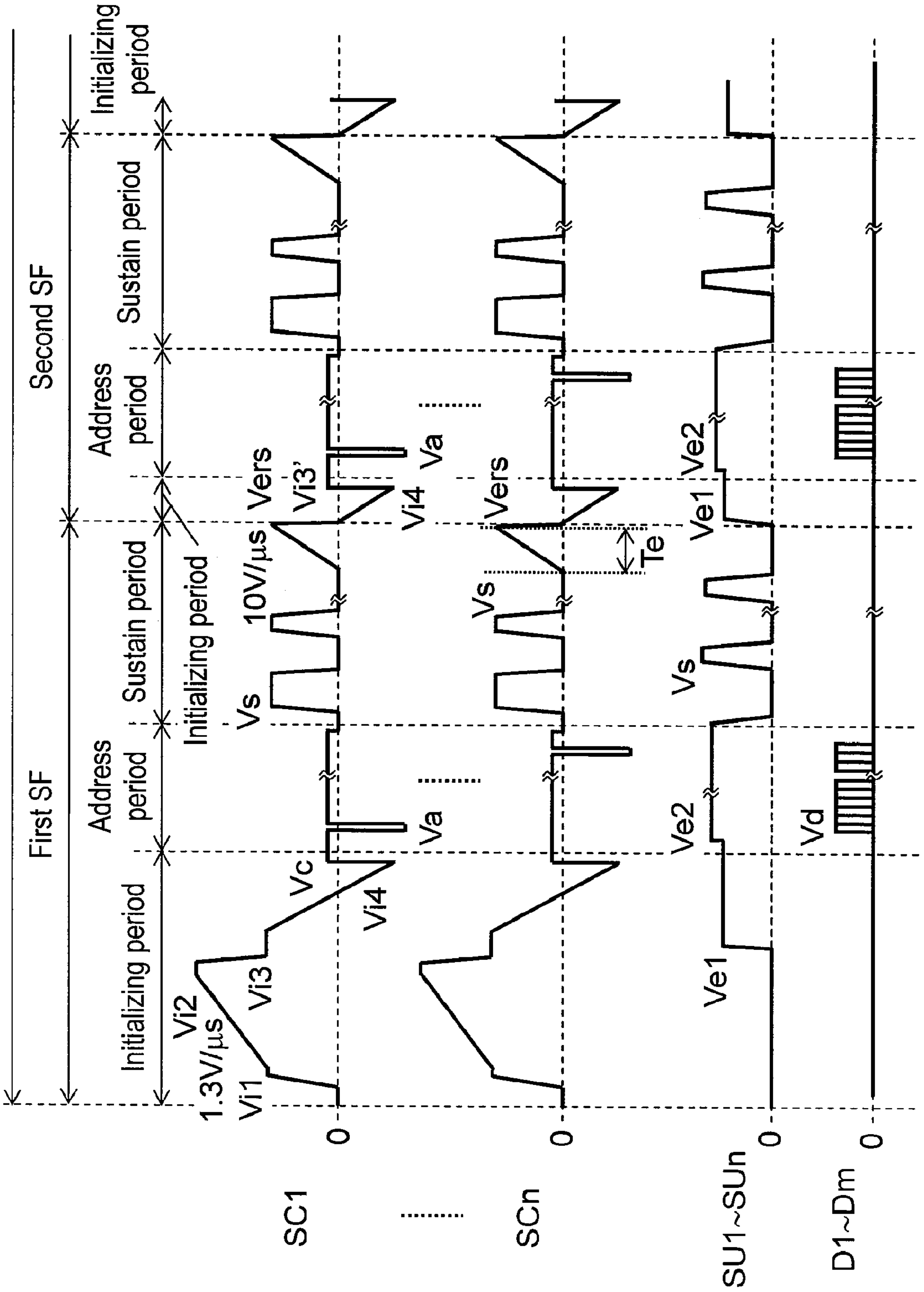
FIG. 3 shows drive voltage waveforms applied to each electrode of the panel.

FIG. 3 shows drive voltage waveforms applied to each electrode of panel 10 in accordance with the first exemplary embodiment of the present invention. FIG. 3 shows drive voltage waveforms of two subfields, that is, a subfield in which an all-cell initializing operation is carried out (hereinafter, referred to as an "all-cell initializing subfield") and a subfield in which a selective initializing operation is carried out (hereinafter, referred to as a "selective initializing subfield"). Also drive voltage waveforms in the other subfields are substantially the same. Furthermore, the below-mentioned scan electrode SCi, sustain electrode SUi, and data electrode Dk are electrodes selected from the respective electrodes on the basis of the image data.

Firstly, the first SF that is an all-cell initializing subfield is described.

In the first half of the initializing period of the first SF, a voltage of 0 (V) is applied to data electrodes D1-Dm and sustain electrodes SU1-SUn, respectively. Furthermore, a gently increasing first inclined waveform voltage (hereinafter, referred to as an "upward ramp waveform voltage") is applied to scan electrodes SC1-SCn. This upward ramp waveform voltage is a voltage gently increasing from voltage Vi1, in which a voltage difference between the voltage on scan electrodes SC1-SCn and the voltage on sustain electrodes SU1-SUn is not more than the discharge start voltage, toward voltage Vi2, in which the voltage difference is more than the discharge start voltage.

In this exemplary embodiment, this upward ramp waveform voltage is generated by setting the gradient to be about 1.3 V/μsec.

While this upward ramp waveform voltage increases, feeble initializing discharge continuously occurs between scan electrodes SC1-SCn and sustain electrodes SU1-SUn and between scan electrode SC1-SCn and data electrodes D1-Dm, respectively. Then, negative wall voltage accumulates on scan electrodes SC1-SCn and positive wall voltage accumulates on data electrodes D1-Dm and sustain electrodes SU1-SUn. This wall voltage on the electrode is a voltage generated by wall charge accumulated on the dielectric layer, the protective layer, the phosphor layer, and the like, which cover the electrodes.

In the latter half of the initializing period, positive voltage Ve1 is applied to sustain electrodes SU1-SUn, and a voltage of 0 (V) is applied to data electrodes D1-Dm. Furthermore, a gently decreasing downward inclined waveform voltage (hereinafter, referred to as a "downward ramp waveform voltage") is applied to scan electrodes SC1-SCn. This downward ramp waveform voltage is a voltage gently decreasing from voltage Vi3, in which a voltage difference between the voltage on scan electrodes SC1-SCn and the voltage on sustain electrodes SU1-SUn is not more than the discharge start voltage, toward voltage Vi4, in which the difference is more than the discharge start voltage (hereinafter, the lowest value in the downward ramp waveform voltage applied to scan electrode SC1-SCn is referred to as "initializing voltage Vi4"). During this time, feeble initializing discharge continuously occurs between scan electrodes SC1-SCn and sustain electrodes SU1-SUn and between scan electrodes SC1-SCn and data electrodes D1-Dm, respectively. Then, the negative wall voltage on scan electrodes SC1-SCn and the positive wall voltage on sustain electrodes SU1-SUn are weakened. The positive wall voltage on data electrodes D1-Dm is adjusted to a value suitable for an address operation. As mentioned above, the all-cell initializing operation in which the initializing discharge is carried out to all discharge cells is completed.

As shown in the initializing period of the second SF in FIG. 3, a drive voltage waveform excluding the first half of the initializing period may be applied to each electrode. That is to say, voltage Ve1 is applied to sustain electrodes SU1-SUn and a voltage of 0(V) is applied to data electrodes D1-Dm, respectively. A downward ramp waveform voltage gently decreasing from voltage Vi3' to initializing voltage Vi4 is applied to scan electrodes SC1-SCn. Thus, in the discharge cell in which sustain discharge has been generated in the preceding subfield, feeble initializing discharge is generated, thus weakening the wall voltage on scan electrode SCi and on sustain electrode SUi. Furthermore, in the discharge cell in which sufficient positive wall voltage is accumulated on data electrode Dk (k=1 to m) by the immediately preceding sustain discharge, an excessive portion of the wall voltage is discharged and a wall voltage is adjusted to a suitable one for an address operation. On the other hand, in the discharge cell in which sustain discharge has not been generated in the preceding subfield, discharge is not generated and wall charge at the end of the initializing period in the preceding subfield is kept. Thus, the initializing operation excluding the first part is a selective initializing operation in which initializing discharge is carried out with respect to the discharge cell in which a sustain operation has been carried out in the sustain period of the immediately preceding subfield.

Herein, this exemplary embodiment has a configuration in which a voltage value of initializing voltage Vi4 is switched with three different voltage values so as to drive panel 10. Hereinafter, the highest initializing voltage Vi4 is denoted by "Vi4H" and the lowest initializing voltage is denoted by "Vi4L." The initializing voltage Vi4 corresponding to a potential between Vi4H and Vi4L is denoted by Vi4M.

In the subsequent address period, firstly, voltage Ve2 is applied to sustain electrodes SU1-SUn, and voltage Vc is applied to scan electrodes SC1-SCn.

Then, while negative scan pulse voltage Va is applied to scan electrode SC1 in the first row, positive address pulse voltage Vd is applied to data electrode Dk (k=1 to m) of a discharge cell to emit light in the first row in data electrodes D1-Dm. At this time, a voltage difference in the intersection between on data electrode Dk and on scan electrode SC1 results in difference (Vd−Va) of externally applied voltages with the difference between the wall voltage on data electrode Dk and the wall voltage on scan electrode SC1 added, which exceeds the discharge start voltage. Thus, discharge occurs between data electrode Dk and scan electrode SC1. Furthermore, since voltage Ve2 is applied to sustain electrodes SU1-SUn, a voltage difference between on sustain electrode SU1 and voltage on scan electrode SC1 results in difference (Ve2−Va) of externally applied voltages with the difference between the wall voltage on sustain electrode SU1 and the wall voltage on scan electrode SC1 added. At this time, by setting voltage Ve2 to a voltage value somewhat lower than the discharge start voltage, a portion between sustain electrode SU1 and scan electrode SC1 can be made to be a state in which discharge is not carried out but discharge tends to occur. Thus, discharge occurring between data electrode Dk and scan electrode SC1 is used as a trigger, and discharge can be generated between sustain electrode SU1 and scan electrode SC1 in a region in which they cross data electrode Dk. Thus, address discharge occurs in the discharge cell to emit light and positive wall voltage accumulates on scan electrode SC1 and negative wall voltage accumulates on sustain electrode SU1, and negative wall voltage accumulates also on data electrode Dk.

Thus, an address operation of causing address discharge in a discharge cell to emit light in the first row and accumulating wall voltage on each electrode is carried out. On the other hand, since a voltage in the intersection portion between data electrodes D1-Dm in which address pulse voltage Vd has not been applied and scan electrode SC1 does not exceed the discharge start voltage, address discharge does not occur. The above-mentioned address operation is carried out until a discharge cell in the n-th row, and thus, an address period is completed.

In the subsequent sustain period, firstly, positive sustain pulse voltage Vs is applied to scan electrodes SC1-SCn and a ground potential as the base potential, that is, a voltage of 0 (V) is applied to sustain electrodes SU1-SUn. Then, in the discharge cell in which address discharge has been generated, the voltage difference between the voltage on scan electrode SCi and the voltage on sustain electrode SUi results in sustain pulse voltage Vs with the voltage difference between the wall voltage on scan electrode SCi and wall voltage on sustain electrode SUi added, which exceeds the discharge start voltage.

Then, sustain discharge occurs between scan electrode SCi and sustain electrode SUi. Ultraviolet light generated at this time allows phosphor layer 35 to emit light. Then, a negative wall voltage accumulates on scan electrode SCi and a positive wall voltage accumulates on sustain electrode SUi. Furthermore, a positive wall voltage accumulates also on data electrode Dk. In the discharge cell in which address discharge has not been generated in the address period, sustain discharge is not generated and a wall voltage at the end of the initializing period is maintained.

Next, 0 (V) as the base potential is applied to scan electrodes SC1-SCn and sustain pulse voltage Vs is applied to sustain electrodes SU1-SUn, respectively. Then, since the voltage difference between the voltage on sustain electrode SUi and the voltage on scan electrode SCi exceeds the discharge start voltage in a discharge cell in which sustain discharge has been generated, sustain discharge is generated between sustain electrode SUi and scan electrode SCi and a negative wall voltage accumulates on sustain electrode SUi and a positive wall voltage accumulates on scan electrode SCi. In the same way since then, sustain pulses of the number of the brightness weight multiplied by brightness magnification are applied alternately to scan electrodes SC1-SCn and sustain electrodes SU1-SUn so as to provide potential difference between the electrodes of display electrode pairs 24. Thus, sustain discharge is continuously carried out in the discharge cell in which an address discharge is generated in the address period.

Then, at the end of the sustain period, a second inclined waveform voltage (hereinafter, referred to as an "erase ramp waveform voltage") gently increasing from 0 (V) as the base potential to voltage Vers is applied to scan electrodes SC1-SCn. Thus, feeble discharge can be generated continuously and a part or all of the wall voltage on scan electrode SCi and sustain electrode SUi are erased with the positive wall voltage on data electrode Dk left.

Specifically, after the voltage on sustain electrodes SU1-SUn is returned to 0 (V), the erase ramp waveform voltage as the second inclined waveform voltage, increasing from 0 (V) as the base potential toward voltage Vers that is more than the discharge start voltage, is generated and is applied to scan electrodes SC1-SCn. Herein, the erase ramp waveform voltage has a steeper gradient than the upward ramp waveform voltage as the first inclined waveform voltage at, for example, a gradient of about 10 V/μsec. Then, feeble discharge is generated between sustain electrode SUi and scan electrode SCi in a discharge cell in which sustain discharge has been generated. Then, this feeble discharge is continuously generated during the period in which the voltage applied to scan electrodes SC1-SCn increases. Then, immediately after the increasing voltage reaches voltage Vers that is a predetermined potential, the voltage applied to scan electrodes SC1-SCn is reduced to 0 (V) as the base potential.

At this time, charged particles generated by this feeble discharge are always accumulated as wall charge on sustain electrode SUi and on scan electrode SCi so as to release the voltage difference between sustain electrode SUi and scan electrode SCi. Thus, a wall voltage between scan electrodes SC1-SCn and sustain electrodes SU1-SUn is weakened to the level of the difference between the voltage applied to scan electrode SCi and the discharge start voltage (i.e., voltage Vers−discharge start voltage) with the positive wall charge on data electrode Dk left. Hereinafter, the last discharge in the sustain period generated by this erase ramp waveform voltage is referred to as "erase discharge."

Note here that this exemplary embodiment employs a configuration in which immediately after the voltage applied to scan electrodes SC1-SCn reaches voltage Vers, the voltage is reduced to 0 (V) as the base potential. This is because it is experimentally confirmed that after the increasing voltage reaches voltage Vers, if this voltage is maintained, abnormal discharge tends to occur in the discharge cells of the below mentioned three conditions.

(1) Discharge cell that itself does not emit light (discharge cell in which address is not carried out in the subfield)

(2) Discharge cell whose adjacent cell emits light (discharge cell in which address has been carried out in the subfield)

(3) Discharge cell that itself causes sustain discharge in the immediately preceding subfield It is desirable that this abnormal discharge is prevented from occurring because it induces error discharge in the subsequent address period. Therefore, this exemplary embodiment has a configuration in which when an erase ramp waveform voltage is generated, immediately after a voltage applied to scan electrodes SC1-SCn reaches voltage Vers, it is reduced to 0 (V) as the base potential. As a result, while this abnormal discharge is prevented from occurring, a wall voltage in a discharge cell can be suitably adjusted so that a subsequent address operation can be carried out stably.

Since an operation in the subsequent subfield is substantially the same as the above-mentioned operation except for the number of sustain pulses in the sustain period, the description thereof is omitted. The above mention is an outline of the drive voltage waveform applied to each electrode of panel 10 in this exemplary embodiment.

In this exemplary embodiment, a voltage value of voltage Vers is set to sustain pulse voltage Vs+3 (V), for example, about 213 (V). Herein, it is desirable that voltage value of voltage Vers is set to a voltage range of not less than sustain pulse voltage Vs−10 (V) and not more than sustain pulse voltage Vs+10 (V). When the voltage value of voltage Vers is set to be larger than this upper limit value, the adjustment of the wall voltage is excessive; and when the voltage value of voltage Vers is set to be smaller than this lower limit value, the adjustment of the wall voltage is insufficient. In any case, the subsequent address operation may not be carried out stably.

Furthermore, this exemplary embodiment describes a configuration in which the gradient of the erase ramp waveform voltage is set to about 10 V/μsec. It is desirable that this gradient is set to be not less than 2 V/μsec and not more than 20 V/μsec. When the gradient is set to be steeper than this upper limit value, discharge for adjusting the wall voltage does not become feeble. Meanwhile, the gradient is set to be gentler than this lower limit value, discharge itself becomes too feeble, which may cause failure in adjustment of the respective wall voltages.

Furthermore, as mentioned above, in this exemplary embodiment, in the initializing period, the voltage value of initializing voltage Vi4 that is a lowest voltage in the downward ramp waveform voltage is switched at three different voltage values, that is, first voltage Vi4L, second voltage Vi4M having a higher voltage value than first voltage Vi4L, and third voltage Vi4H having a further higher voltage value than Vi4M to generate a downward ramp waveform voltage. Then, the voltage value of initializing voltage Vi4 is switched at Vi4L, Vi4M and Mi4H according to the total number of sustain pulses in the sustain period and the temperature of panel 10 detected by the below-mentioned panel temperature detecting circuit to generate the downward ramp waveform voltage. Thus, stable address discharge is realized.

Next, a configuration of the subfield is described. FIGS. 4, 5A, 5B and 5C show one example of the configuration of the subfield respectively in accordance with the first exemplary embodiment. Note here that FIGS. 4, 5A, 5B and 5C schematically show a drive waveform in one field period in the subfield method. The respective drive voltage waveforms are equal to those in FIG. 3.

Figure 4:
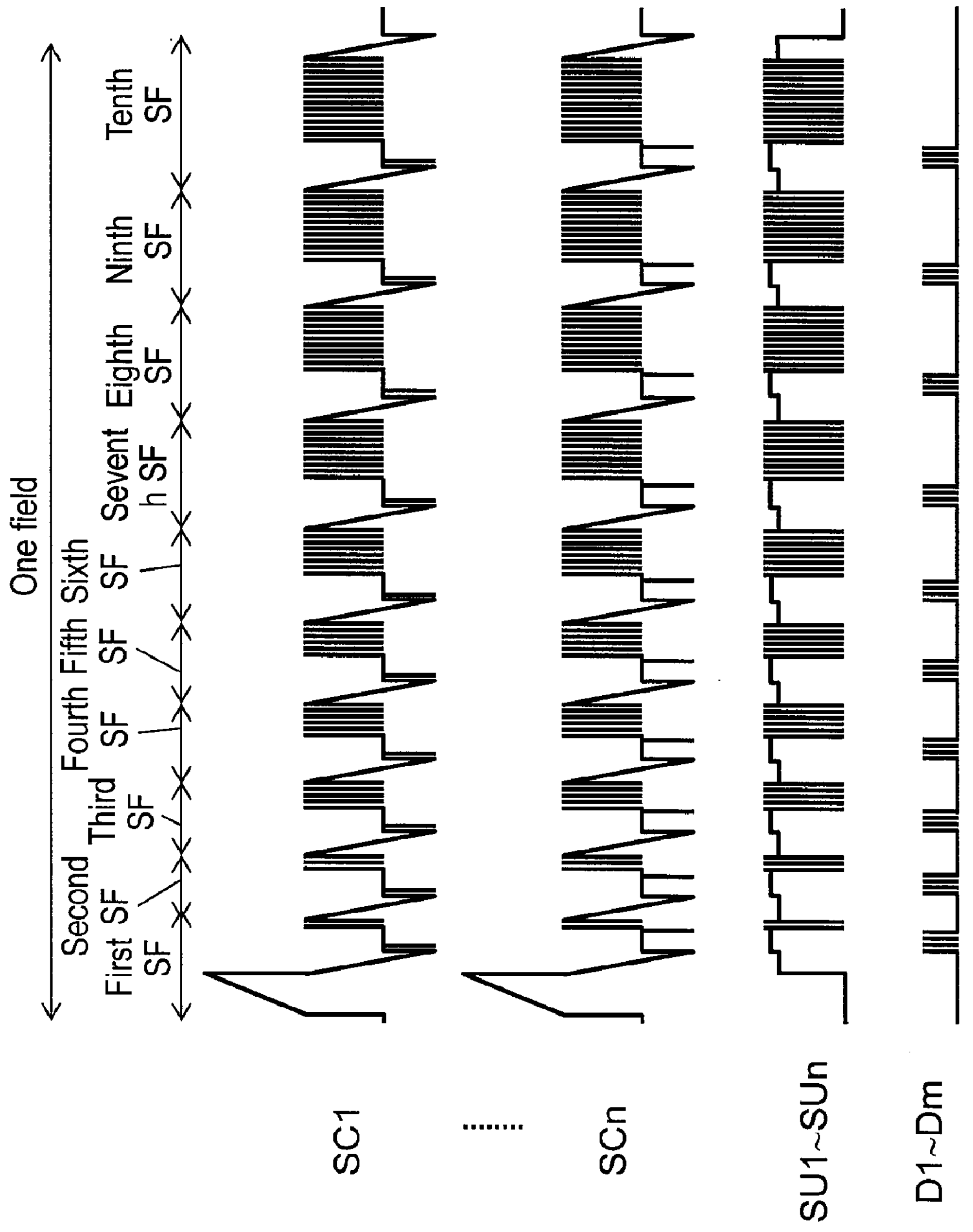
FIG. 4 shows one example of a configuration of a subfield in accordance with the first exemplary embodiment of the present invention.

As shown in FIG. 4, in this exemplary embodiment, one field includes ten subfields (first SF, second SF, . . . , and tenth SF). In the sustain period of each subfield, sustain pulses of the number of the brightness weight of each subfield multiplied by a predetermined brightness magnification are applied to each display electrode pair 24. The total number of the sustain pulses in each subfield is, for example, 5, 10, 15, 29, 54, 88, 146, 215, 293 and 395. Then, in the initializing period of the first SF, an all-cell initializing operation is carried out; and in the initializing periods of the second to tenth SFs, a selective initializing operation is carried out. Thus, the light emission unrelated to image display is only light emission accompanying the discharge in the all-cell initializing operation of the first SF. Black brightness, which is brightness in a black display region in which sustain discharge is not generated, is only feeble light emission in the all-cell initializing operation, enabling image display with a high contrast to be carried out.

However, in this exemplary embodiment, the number of subfields and the brightness weight of each subfield are not limited to the above-mentioned values. Furthermore, a configuration in which a subfield structure is changed on the basis of an image signal and the like may be employed.

As mentioned above, according to the total number of sustain pulses in the sustain period and the temperature of panel 10 detected by the below-mentioned panel temperature detecting circuit, the voltage value of initializing voltage Vi4 of the downward ramp waveform voltage is switched at three different voltage values, that is, Vi4L, Vi4M and Vi4H to generate a downward ramp waveform voltage.

Figure 5A:
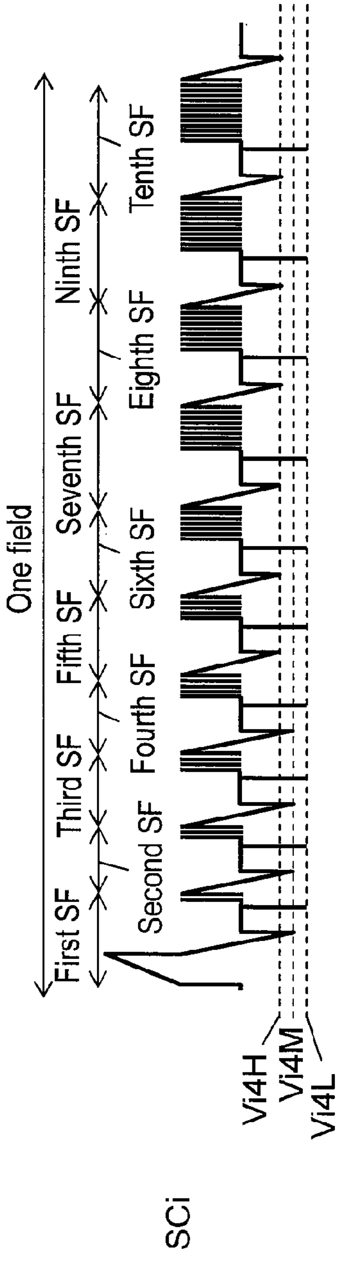
FIG. 5A shows one example of a configuration of a subfield in accordance with the first exemplary embodiment of the present invention.

Specifically, when the below-mentioned panel temperature detecting circuit determines that the temperature of panel 10 is a high temperature (herein, not less than 55° C.), as shown in FIG. 5A, initializing voltage Vi4 is set to Vi4M in the initializing period of the subfield in which the total number of sustain pulses in the immediately preceding subfield is less than 20 (herein, second to fourth SFs) and in the initializing period of all-cell initializing subfield (herein, first SF). Furthermore, initializing voltage Vi4 is set to Vi4H to generate a downward ramp waveform voltage in the initializing period of the subfield in which the total number of sustain pulses in the immediately preceding subfield is not less than 20 (herein, fifth to tenth SFs). Thus, the initializing operation is carried out. That is to say, the drive circuit for driving a scan electrode may set the lowest voltage to the third voltage to generate a downward inclined waveform voltage in the subfield in which the total number of sustain pulses in the sustain period of the immediately preceding subfield is not less than a predetermined number when the temperature detected by the panel temperature detecting circuit is determined to be not less than the high-temperature threshold value. In this exemplary embodiment, as mentioned above, the predetermined number is set to 20.

Figure 5B:
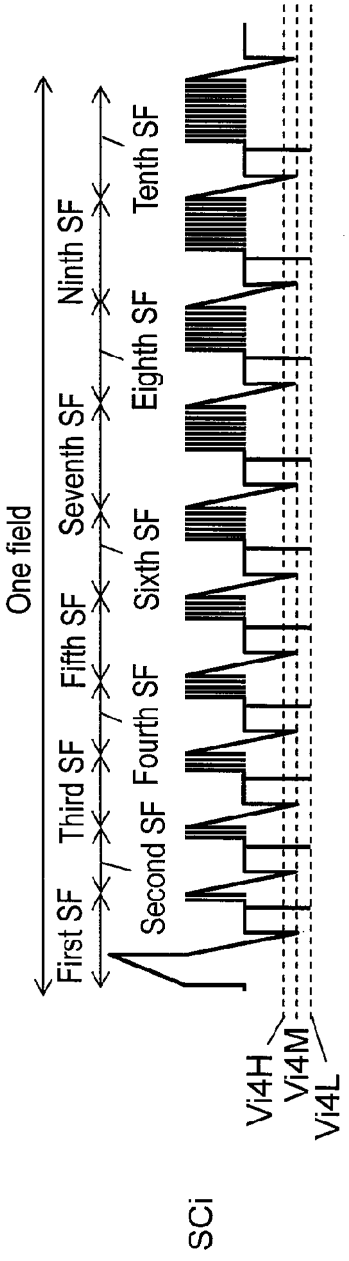
FIG. 5B shows one example of a configuration of a subfield in accordance with the first exemplary embodiment of the present invention.

Furthermore, when the panel temperature detecting circuit determines that the temperature of panel 10 is a middle temperature (herein, not less than 20° C. and less than 55° C.), as shown in FIG. 5B, initializing voltage Vi4 is set to Vi4M to generate a downward ramp waveform voltage in the initializing period of all subfields. Thus, an initializing operation is carried out.

Figure 5C:
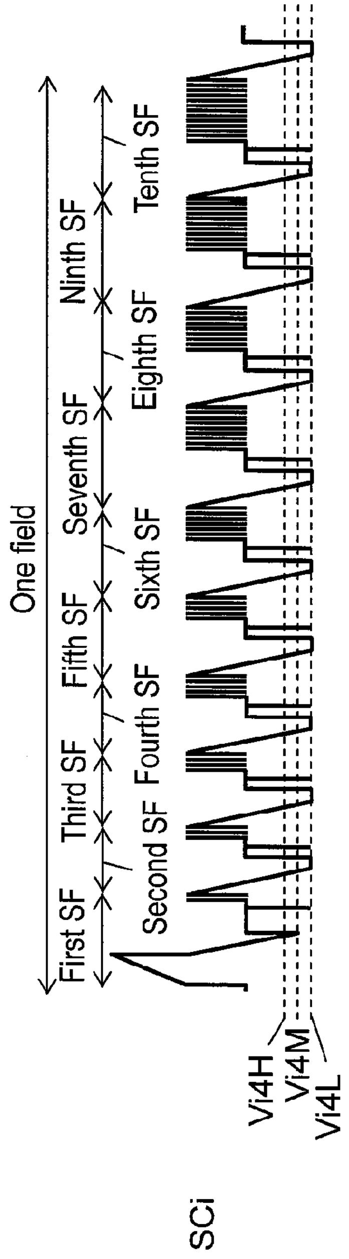
FIG. 5C shows one example of a configuration of a subfield in accordance with the first exemplary embodiment of the present invention.

Furthermore, when the panel temperature detecting circuit determines that the temperature of panel 10 is a low temperature (herein, less than 20° C.), as shown in FIG. 5C, initializing voltage Vi4 is set to Vi4M in the initializing period of the first SF carrying out an all-cell initializing operation, initializing voltage Vi4 is set to Vi4L in the initializing period of the second to tenth SFs, and a downward ramp waveform voltage is generated. Thus, the initializing operation is carried out.

In this exemplary embodiment, with such a configuration, stable address discharge is realized for the following reasons.

In the initializing period in which wall charge necessary for address discharge is formed on each electrode, initializing discharge is generated by applying a downward ramp waveform voltage to scan electrodes SC1-SCn. Therefore, a state of the wall charge formed on each electrode is changed in accordance with the voltage value of the lowest initializing voltage Vi4 of the downward ramp waveform voltage, and applied voltage necessary for the subsequent address discharge is changed.

Figure 6:
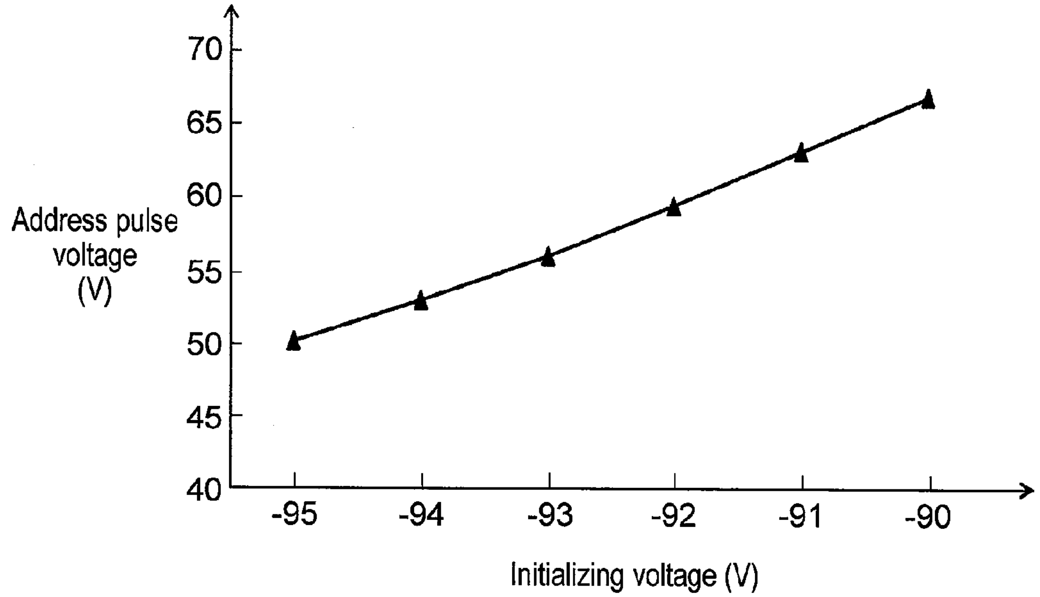
FIG. 6 is a graph showing a relation between an initializing voltage and an address pulse voltage in accordance with the first exemplary embodiment of the present invention.

FIG. 6 is a graph showing a relation between initializing voltage Vi4 and an address pulse voltage in accordance with the first exemplary embodiment of the present invention. In FIG. 6, the ordinate represents address pulse voltage Vd necessary to generate stable address discharge and the abscissa represents initializing voltage Vi4.

As shown in FIG. 6, the lower initializing voltage Vi4 is, the lower address pulse voltage Vd necessary to generate stable address discharge is. For example, when initializing voltage Vi4 is about −90 (V), address pulse voltage Vd is about 66 (V). Meanwhile, when initializing voltage Vi4 is about −95 (V), address pulse voltage Vd is about 50 (V). In other words, when initializing voltage Vi4 is changed from about −90 (V) to about −95 (V), voltage Vd necessary to generate stable address discharge is reduced by about 16 (V).

Figure 7:
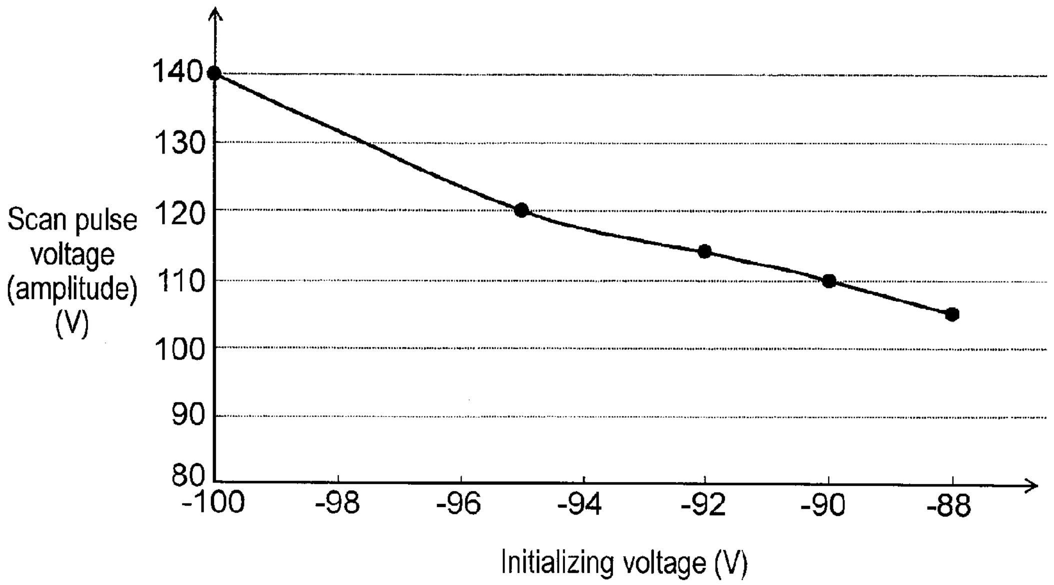
FIG. 7 is a graph showing a relation between an initializing voltage and a scan pulse voltage in accordance with the first exemplary embodiment of the present invention.

On the other hand, initializing voltage Vi4 and scan pulse voltage Va necessary to generate stable address discharge have the following relation. FIG. 7 is a graph showing a relation between initializing voltage Vi4 and a scan pulse voltage in accordance with the first exemplary embodiment of the present invention. In FIG. 7, the ordinate represents scan pulse voltage (amplitude) necessary to generate stable address discharge and the abscissa represents initializing voltage Vi4.

Then, as shown in FIG. 7, the lower initializing voltage Vi4 is, the larger scan pulse voltage Va necessary to generate stable address discharge becomes. For example, when initializing voltage Vi4 is about −90 (V), the amplitude of the scan pulse voltage is about 110 (V). Meanwhile, when initializing voltage Vi4 is about −95 (V), the amplitude of the scan pulse voltage is about 120 (V). In other words, when initializing voltage Vi4 is changed from about −90 (V) to about −95 (V), scan pulse voltage Va necessary to generate stable address discharge is increased by about as much as 10 (V).

Thus, when initializing voltage Vi4 is reduced, address pulse voltage Vd necessary to generate stable address discharge is reduced. On the contrary, scan pulse voltage Va necessary to generate stable address discharge is increased.

On the other hand, it is confirmed that address pulse voltage Vd necessary to generate stable address discharge is reduced in a subfield following the subfield in which the number of generation of sustain discharge is large, as compared with the subfield of otherwise. This is thought to be because priming particles are sufficiently formed in the sustain period in which the total number of the sustain pulses is large and sustain discharge is generated at sufficient times. That is to say, in the subfield following the subfield in which much sustain discharge is generated and sufficient priming particles are formed, initializing voltage Vi4 can be set to relatively high. Thus, since scan pulse voltage Va necessary to generate stable address discharge can be reduced, address discharge can be generated stably.

On the contrary, since, address pulse voltage Vd necessary to generate stable address discharge is not easily reduced in the subfield following the subfield in which the number of generation of sustain discharge is small, it is desired that initializing voltage Vi4 is not set to be too high. Furthermore, immediately after the all-cell initializing operation is carried out, since a wall voltage must be adjusted sufficiently by discharge by the downward ramp waveform voltage, it is necessary that a certain level of the duration time period of discharge by the downward ramp waveform voltage is secured.

Furthermore, it is confirmed that scan pulse voltage Va necessary to generate stable address discharge is changed depending upon the temperature of panel 10.

Figure 8:
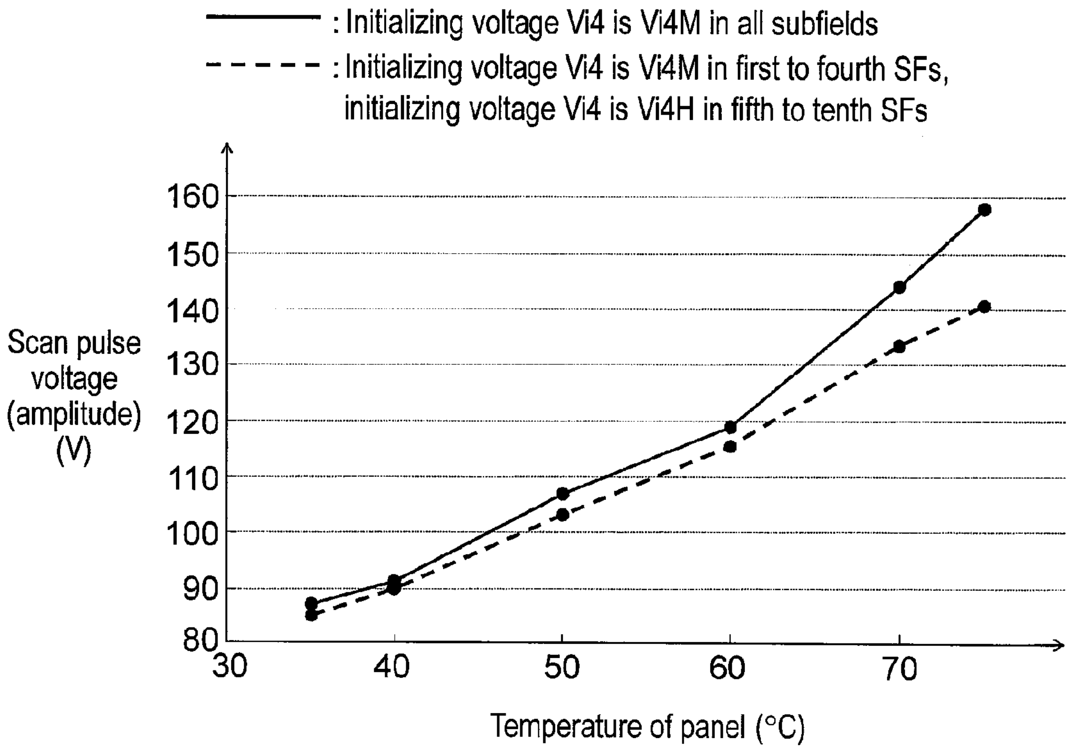
FIG. 8 is a graph showing a relation between a temperature of a panel and a scan pulse voltage in accordance with the first exemplary embodiment of the present invention.

FIG. 8 is a graph showing a relation between a temperature of a panel and a scan pulse voltage in accordance with the first exemplary embodiment of the present invention. In FIG. 8, the ordinate represents a scan pulse voltage (amplitude) necessary to generate stable address discharge and the abscissa represents a temperature of panel 10. Furthermore, the solid line in FIG. 8 represents the result when initializing voltage Vi4 is set to Vi4M in all subfields; and the broken line in FIG. 8 represents the result when initializing voltage Vi4 is set to Vi4M in the first to fourth SFs and initializing voltage Vi4 is set to Vi4H in the fifth to tenth SFs.

Then, as shown in FIG. 8, it is confirmed that the lower the temperature of panel 10 is, the lower scan pulse voltage Va necessary to generate stable address discharge becomes. For example, in the solid line in FIG. 8, when the temperature of panel 10 is 70 (° C.), the amplitude of the scan pulse voltage is about 144 (V). Meanwhile, when the temperature of panel 10 is 35 (° C.), the amplitude of the scan pulse voltage is about 88 (V). Furthermore, when the temperature of panel 10 is 35 (° C.), scan pulse voltage Va necessary to generate stable address discharge is reduced by about as much as 56 (V) as compared with the case where the temperature of panel 10 is 70 (° C.).

That is to say, when temperature of panel 10 is low, since scan pulse voltage Va necessary to generate stable address discharge is reduced, it is desirable that initializing voltage Vi4 is set to be low so as to reduce address pulse voltage Vd necessary to generate stable address discharge. Furthermore, when the temperature of panel 10 is high, since scan pulse voltage Va necessary to generate stable address discharge becomes higher, it is desirable that initializing voltage Vi4 is set to be high in order to reduce the necessary scan pulse voltage.

As mentioned above, this exemplary embodiment has a configuration in which when the below-mentioned temperature detecting circuit determines that the temperature of panel 10 is high (herein, not lower than 55°), as shown in FIG. 5A, initializing voltage Vi4 is set to Vi4H to generate the downward ramp waveform voltage in the subfields (herein, the fifth to tenth SFs) in which the total number of sustain pulses in the sustain period of the immediately preceding subfield is large (herein, the total number of not less than 20). However, for the above-mentioned reasons, initializing voltage Vi4 is set to Vi4M in the initializing period of the subfield in which the total number of sustain pulses in the immediately preceding subfield is less than 20 and in the initializing period of the all-cell initializing subfield (hereinafter, the first to fourth SFs).

In addition, in this exemplary embodiment, when the panel temperature detecting circuit determines that the temperature of panel 10 is a middle temperature (herein, not less than 20° C. and less than 55° C.), as shown in FIG. 5B, initializing voltage Vi4 is set to Vi4M to generate a downward ramp waveform voltage in all subfields. When the panel temperature detecting circuit determines that the temperature of panel 10 is a low temperature (herein, less than 20° C.), as shown in FIG. 5C, initializing voltage Vi4 is set to Vi4M in the all-cell initializing subfield (herein, the first SF) and in the subfields excluding the all-cell initializing subfield (herein, the second to tenth SFs), initializing voltage Vi4 is set to Vi4L to generate a downward ramp waveform voltage.

With such a subfield configuration, even in a panel with a high resolution, it is possible to generate address discharge stably without increasing the voltage necessary to generate address discharge.

Note here that the broken line in FIG. 8 represents the result when initializing voltage Vi4 is set to Vi4M in the first to fourth SFs and initializing voltage Vi4 is set to Vi4H in the fifth to tenth SFs. Furthermore, the solid line in FIG. 8 represents the result when initializing voltage Vi4 is set to Vi4M in all subfields. Therefore, from the comparison of the both results, it is confirmed that, for example, in the broken line, when the temperature of panel 10 is 70 (° C.), the scan pulse voltage (amplitude) necessary to generate stable address discharge can be reduced by about 10 (V); and when the temperature of panel 10 is 60 (° C.), the scan pulse voltage (amplitude) necessary to generate stable address discharge can be reduced by about 5 (V).

In this exemplary embodiment, when the panel temperature detecting circuit determines that the temperature of panel 10 is a low temperature (herein, less than 20° C.), initializing voltage Vi4 is set to Vi4M in the initializing period of the first SF in which an all-cell initializing operation is carried out. This is because of the following reason. Since a discharge delay tends to be large when the temperature of the panel is low and a wall voltage formed at the time when an upward ramp waveform voltage is applied in the all-cell initializing operation in the first SF is easily reduced as compared with the time when the panel temperature is high, duration time of discharging at the downward ramp waveform voltage having an effect of adjusting the wall voltage is prevented from being prolonged.

Figure 9:
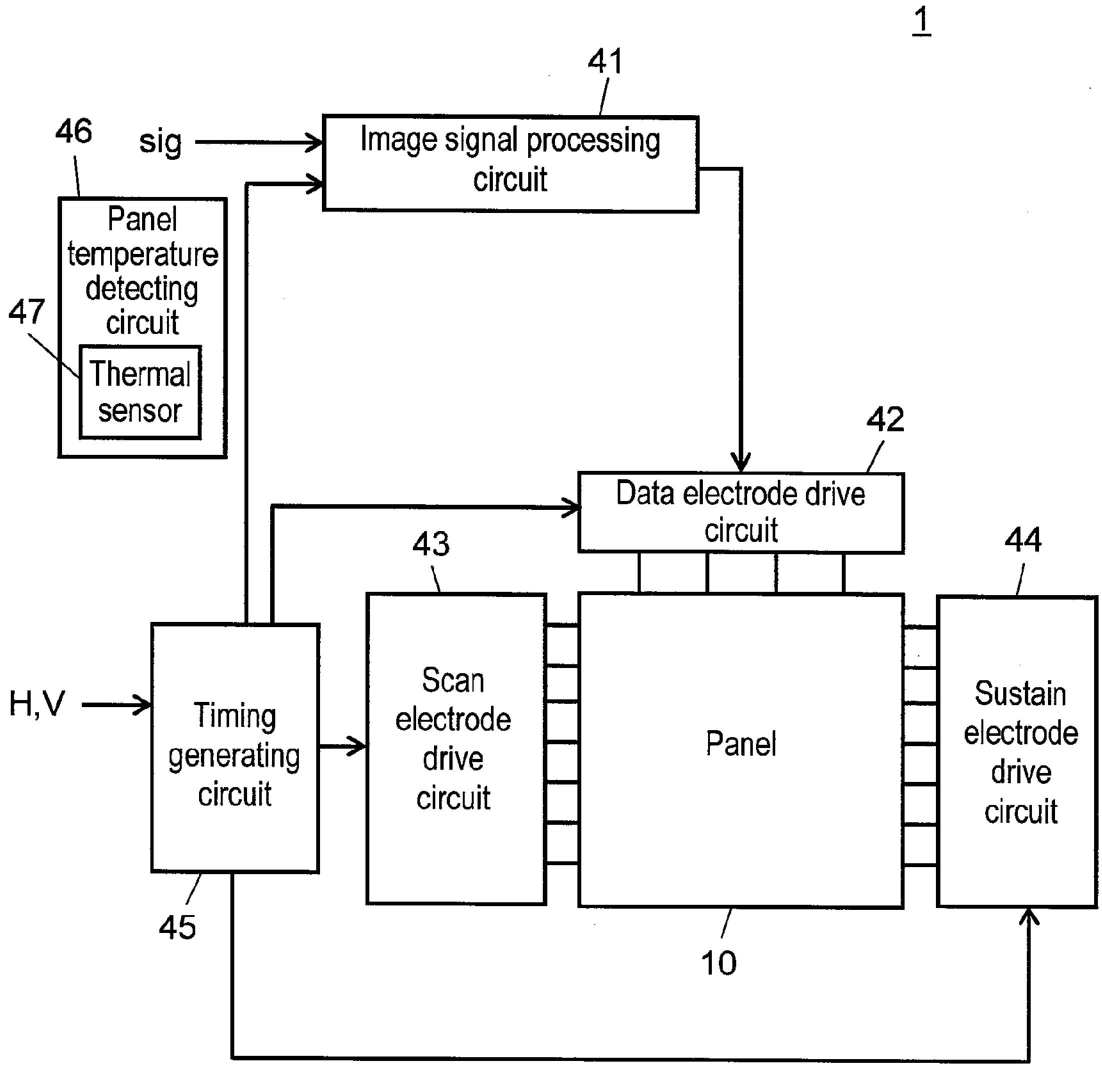
FIG. 9 is a circuit block diagram showing a plasma display device in accordance with the first exemplary embodiment of the present invention.

Next, a configuration of a plasma display device in this exemplary embodiment is described. FIG. 9 is a circuit block diagram showing plasma display device 1 in accordance with the first exemplary embodiment of the present invention. Plasma display device 1 includes panel 10, image signal processing circuit 41, data electrode drive circuit 42, scan electrode drive circuit 43, sustain electrode drive circuit 44, timing generating circuit 45, panel temperature detecting circuit 46, and power supply circuit (not shown) for supplying power supply necessary for each circuit block.

Image signal processing circuit 41 converts an input image signal sig into image data showing light emission/non-light emission for every subfield. Data electrode drive circuit 42 converts image data for every subfield into a signal corresponding to each of data electrodes D1-Dm so as to drive each of data electrodes D1-Dm.

Panel temperature detecting circuit 46 includes thermal sensor 47 made of a generally known element such as a thermo-couple used for detecting the temperature. Then, panel temperature detecting circuit 46 compares the temperature of panel 10 detected by thermal sensor 47 with a predetermined low-temperature threshold value and a high-temperature threshold value so as to determine whether the panel temperature is a low temperature or a middle temperature or high temperature. Then, panel temperature detecting circuit 46 outputs the results to timing generating circuit 45. Specifically, panel temperature detecting circuit 46 sets 20° C. as a low-temperature threshold value and 55° C. as a high-temperature threshold value, and it determines whether the panel temperature is a low temperature (less than 20° C.) or a middle temperature (not less than 20° C. and less than 55° C.) or a high temperature (not less than 55° C.). Then, panel temperature detecting circuit 46 outputs a signal showing the result to timing generating circuit 45. Note here that these values are just examples, and the values may be optimized according to characteristics of the panel, specifications of the plasma display device, or the like.

Timing generating circuit 45 generates various types of timing signals for controlling the operation of each circuit block on the basis of horizontal synchronizing signal H, vertical synchronizing signal V and the output from panel temperature detecting circuit 46. Then, timing generating circuit 45 supplies the respective circuit blocks with various timing signals. Then, as mentioned above, this exemplary embodiment has a configuration in which in the initializing period, initializing voltage Vi4 of the downward ramp waveform voltage applied to scan electrodes SC1-SCn is controlled on the basis of the temperature of the panel. Therefore, timing generating circuit 45 outputs a timing signal corresponding to the temperature of the panel to scan electrode drive circuit 43. Thus, an address operation is stabilized.

Scan electrode drive circuit 43 includes an initializing waveform generating circuit (not shown), a sustain pulse generating circuit (not shown) and a scan pulse generating circuit (not shown). Herein, the initializing waveform generating circuit generates an initializing waveform voltage applied to scan electrodes SC1-SCn in the initializing period. The sustain pulse generating circuit generates a sustain pulse applied to scan electrodes SC1-SCn in the sustain period. Furthermore, the scan pulse generating circuit generates a scan pulse voltage applied to scan electrodes SC1-SCn in an address period. Scan electrode drive circuit 43 drives each of scan electrodes SC1-SCn on the basis of the timing signal. Sustain electrode drive circuit 44 includes a sustain pulse generating circuit (not shown) and a circuit for generating voltage Ve1 and voltage Ve2, and drives each of sustain electrodes SU1-SUn on the basis of the timing signal.

Figure 10:
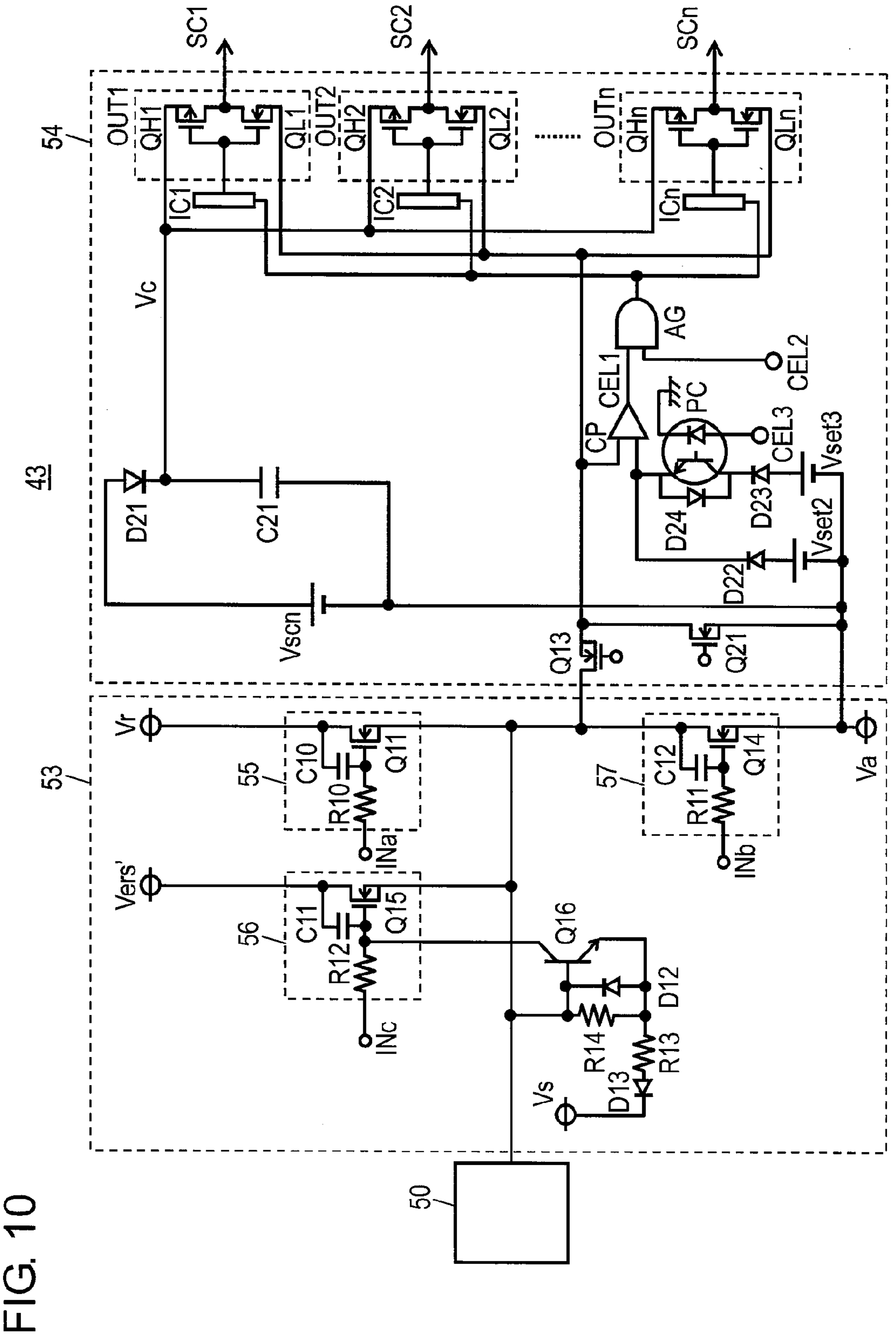
FIG. 10 is a circuit block diagram showing a scan electrode drive circuit in accordance with the first exemplary embodiment of the present invention.

Next, scan electrode drive circuit 43 is described. FIG. 10 is a circuit diagram showing scan electrode drive circuit 43 in accordance with the first exemplary embodiment of the present invention. Scan electrode drive circuit 43 includes sustain pulse generating circuit 50 for generating a sustain pulse, initializing waveform generating circuit 53 for generating an initializing waveform, and scan pulse generating circuit 54 for generating a scan pulse. Note here that FIG. 10 shows an isolating circuit using switching element Q13. In the below mentioned description, an operation for making a switching element to be conductive is expressed by "on," an operation for blocking is expressed by "off," a signal for turning the switching element on is expressed by "Hi," and a signal for turning the switching element off is expressed by "Lo."

Sustain pulse generating circuit 50 includes the below-mentioned power recovery circuit and the below-mentioned clamping circuit, and switches each switching element provided inside on the basis of the timing signal output from timing generating circuit 45 to generate sustain pulse voltage Vs.

Initializing waveform generating circuit 53 includes first Miller integrating circuit 55, second Miller integrating circuit 56 and third Miller integrating circuit 57. Herein, first Miller integrating circuit 55 is a first inclined waveform generating circuit including switching element Q11, capacitor C10 and resistor R10 and generating an upward ramp waveform voltage at the time of the initializing operation, gently increasing toward voltage Vi2 in a ramp-shaped manner. Furthermore, second Miller integrating circuit 56 is a second inclined waveform generating circuit including switching element Q15, capacitor C11 and resistor R12 and generating an erase ramp waveform voltage gently increasing toward voltage Vers in a ramp-shaped manner. Then, third Miller integrating circuit 57 is a third inclined waveform generating circuit including switching element Q14, capacitor C12 and resistor R11 and generating a downward ramp waveform voltage at the time of the initializing operation, gently decreasing toward a predetermined initializing voltage Vi4 in a ramp-shaped manner. In FIG. 10, respective input terminals of the Miller integrating circuits are denoted by input terminal INa, input terminal INb and input terminal INc.

Furthermore, in this exemplary embodiment, in order to precisely stop the increase of the voltage at voltage Vers at the time when the erase ramp waveform voltage is generated, there is provided a switching circuit for comparing the erase ramp waveform voltage with voltage Vers and stopping the operation of the second Miller integrating circuit that generates the erase ramp waveform voltage immediately after the erase ramp waveform voltage reaches voltage Vers. Specifically, back-flow preventing diode D13, resistor R13 for adjusting voltage value of voltage Vers, switching element Q16 for turning input terminal Inc of second Miller integrating circuit 56 into "Lo" when a voltage output from initializing waveform generating circuit 53 reaches voltage Vers, protective diode D12, and resistor R14 are provided.

Switching element Q16 is made of a generally-used NPN transistor and has a base connected to an output of initializing waveform generating circuit 53, a collector connected to input terminal INc of second Miller integrating circuit 56, and an emitter connected to voltage Vs via serially connected resistor R13 and diode D13. Resistor R13 sets its resistance value so that switching element Q16 is turned on when a voltage output from initializing waveform generating circuit 53 reaches voltage Vers. Therefore, when a voltage output from initializing waveform generating circuit 53 reaches voltage Vers, switching element Q16 is turned on. Then, since an electric current input into input terminal INc in order to operate second Miller integrating circuit 56 is pulled out by switching element Q16, an operation of second Miller integrating circuit 56 is stopped.

In general, in the Miller integrating circuit, a gradient of the ramp waveform to be generated tends to be affected by variation of elements constituting the circuit. Therefore, when the waveform is formed only in the operation period of the Miller integrating circuit, the highest voltage value in the ramp waveform tends to vary. Meanwhile, in this exemplary embodiment, it is confirmed to be desirable that the highest voltage value in an erase ramp waveform voltage is in ±3 (V) with respect to the intended voltage value. Therefore, by using a configuration in accordance with this exemplary embodiment, it can be in ±1 (V) with respect to the intended voltage value. Accordingly, it is possible to generate an erase ramp waveform voltage with a high accuracy.

Note here that it is desirable that voltage Vers' is set to be higher than voltage Vers. In this exemplary embodiment, voltage Vers' is set to Vs+30 (V). Furthermore, in this exemplary embodiment, a resistance value of resistor R13 is set so that voltage Vers is voltage Vs+3 (V). Specifically, resistor R13 is set to 100Ω, voltage Vs is set to 210 (V), and resistor R14 is set to 1 kΩ. However, these values are just set on the basis of a 42-inch panel whose number of the display electrode pairs is 1080, and the values may be optimized according to characteristics of the panel, specifications of the plasma display device, or the like.

Initializing waveform generating circuit 53 generates the above-mentioned initializing waveform voltage or erase ramp waveform voltage on the basis of the timing signal output from timing generating circuit 45.

For example, when the upward ramp waveform voltage in the initializing waveform is generated, a constant current for a predetermined voltage (for example, 15 (V)) is input into input terminal INa so as to turn input terminal INa into "Hi". Thus, a predetermined current flows from resistor R10 toward capacitor C10, a source voltage of switching element Q11 increases in a ramp-shaped manner, and an output voltage of scan electrode drive circuit 43 also starts to increase in a ramp-shaped manner.

Furthermore, when a downward ramp waveform voltage in the initializing waveform in the all-cell initializing operation and the selective initializing operation is generated, a constant current for a predetermined voltage (for example, 15 (V)) is input into input terminal INb so as to turn input terminal INb into "Hi". Then, a predetermined current flows from resistor R1 toward capacitor C12, a drain voltage of switching element Q14 decreases in a ramp-shaped manner, and an output voltage of scan electrode drive circuit 43 also starts to decrease in a ramp-shaped manner.

Furthermore, when an erase ramp waveform voltage is generated in the end of the sustain period, a constant current for a predetermined voltage is input into input terminal INc so as to turn input terminal INc into "Hi". Thus, a predetermined current flows from resistor R12 toward capacitor C11, a source voltage of switching element Q15 increases in a ramp-shaped manner, and an output voltage of scan electrode drive circuit 43 also starts to increase in a ramp-shaped manner. In this exemplary embodiment, the resistance value of resistor R12 is made to be smaller than the resistance value of resistor R10. Thus, the erase ramp waveform voltage as the second inclined waveform voltage is generated with a steeper gradient than that of the upward ramp waveform voltage as the first inclined waveform voltage.

Then, when a drive voltage waveform output from initializing waveform generating circuit 53 gradually increases and becomes higher than voltage Vers, switching element Q16 is turned on. A constant current input into input terminal INc is pulled out by switching element Q16 and an operation of second Miller integrating circuit 56 is stopped. Thus, a drive voltage waveform output from initializing waveform generating circuit 53 is immediately reduced to 0 (V) as the base potential. Thus, in this exemplary embodiment, the increase of the voltage at the time of generating the erase ramp waveform voltage is precisely stopped at voltage Vers. Immediately thereafter, the voltage is reduced to a voltage of 0 (V) as the base potential.

Scan pulse generating circuit 54 includes switching circuits OUT1-OUTn, switching element Q21, control circuits IC1-ICn, diode D21 and capacitor C21. Herein, switching circuits OUT1-OUTn output a scan pulse voltage to each of scan electrodes SC1-SCn. Furthermore, switching element Q21 clamps the low voltage sides of switching circuits OUT1-OUTn to voltage Va. Then, control circuits IC1-ICn control switching circuits OUT1-OUTn. Furthermore, diode D21 and capacitor C21 apply voltage Vc obtained by superimposing voltage Vscn to voltage Va to the higher voltage side of switching circuits OUT1-OUTn. Then, each of switching circuits OUT1-OUTn includes switching elements QH1-QHn for outputting voltage Vc and switching elements QL1-QLn for outputting voltage Va. Then, scan pulse voltage Va applied to scan electrodes SC1-SCn in the address period on the basis of the timing signal output from timing generating circuit 45 is sequentially generated. Scan pulse generating circuit 54 outputs a voltage waveform of initializing waveform generating circuit 53 in the initializing period, and outputs a voltage waveform of sustain pulse generating circuit 50 as it is in the sustain period.

Furthermore, scan pulse generating circuit 54 includes AND gate AG for carrying out an AND operation, comparator CP for comparing the sizes of input signals input into two input terminals, and a generally used photo-coupler PC for carrying out a switching operation, back-flow preventing diode D22, back-flow preventing diode D23 and protective diode D24. Photo-coupler PC switches the switching operation by switching between "Hi"/"Lo" of switching signal CEL3. As switching signal CEL3, for example, a timing signal output from timing generating circuit 45 can be used. Voltage Vset3 is higher than voltage Vset2. Therefore, when photo-coupler PC is turned off, a voltage obtained by superimposing voltage Vset2 to voltage Va is input into comparator CP. However, when photo-coupler PC is turned on, voltage (Va+Vset3) obtained by superimposing voltage Vset3 to voltage Va is input into comparator CP by the action of back-flow preventing diode D22. Then, when photo-coupler PC is turned off, comparator CP compares voltage (Va+Vset2) with a drive voltage waveform. On the other hand, when photo-coupler PC is turned on, comparator CP compares voltage (Va+Vset3) with a drive voltage waveform. Then, comparator CP outputs "0" when the drive voltage waveform is higher than voltage (Va+Vset2) or voltage (Va+Vset3), and outputs "1" otherwise.

Two input signals, that is, output signal CEL1 of comparator CP and switching signal CEL2 are input into AND gate AG. As switching signal CEL2, for example, a timing signal output from timing generating circuit 45 can be used. Then, AND gate AG outputs "1" when both input signals are "1," and outputs "0" otherwise. The output of AND gate AG is input into control circuits IC1-ICn. When the output of AND gate AG is "0", drive voltage waveform is output to switching circuits OUT1-OUTn via switching elements QL1-QLn, respectively. Furthermore, when the output of AND gate AG is "1", a predetermined voltage Vc that is a voltage obtained by superimposing voltage Vscn to Va is output to switching circuits OUT1-OUTn via switching elements QH1-QHn, respectively. That is to say, AND gate AG serves as a switching element for switching whether the output from comparator CP is effective or ineffective. In this exemplary embodiment, in this way, initializing voltage Vi4 is switched at Vi4L, Vi4M and Vi4H. Note here that initializing voltage Vi4 is set to Vi4L when switching signal CEL2 is set to "Lo". Furthermore, initializing voltage Vi4 is set to Vi4M when switching signal CEL2 is set to "Hi" and switching signal CEL3 is set to "Lo". Furthermore, initializing voltage Vi4 is set to Vi4H when switching signal CEL2 is set to "Hi" and switching signal CEL3 is set to "Hi". Note here that in this exemplary embodiment, voltage Vset2 is set to 6 (V) and voltage Vset3 is set to 10 (V). These numeric values are just examples and they may be optimized according to characteristics of the panel, specifications of the plasma display device, or the like.

In this exemplary embodiment, a Miller integrating circuit using a practical and relatively simple-structured FET is employed for a first, second and third inclined waveform generating circuits. However, an inclined waveform generating circuit is not limited to this configuration, and any circuits may be used as long as they can generate an upward ramp waveform voltage and a downward ramp waveform voltage.

Next, sustain pulse generating circuit 50 of scan electrode drive circuit 43 and sustain pulse generating circuit 60 of sustain electrode drive circuit 44 are described.

Figure 11:
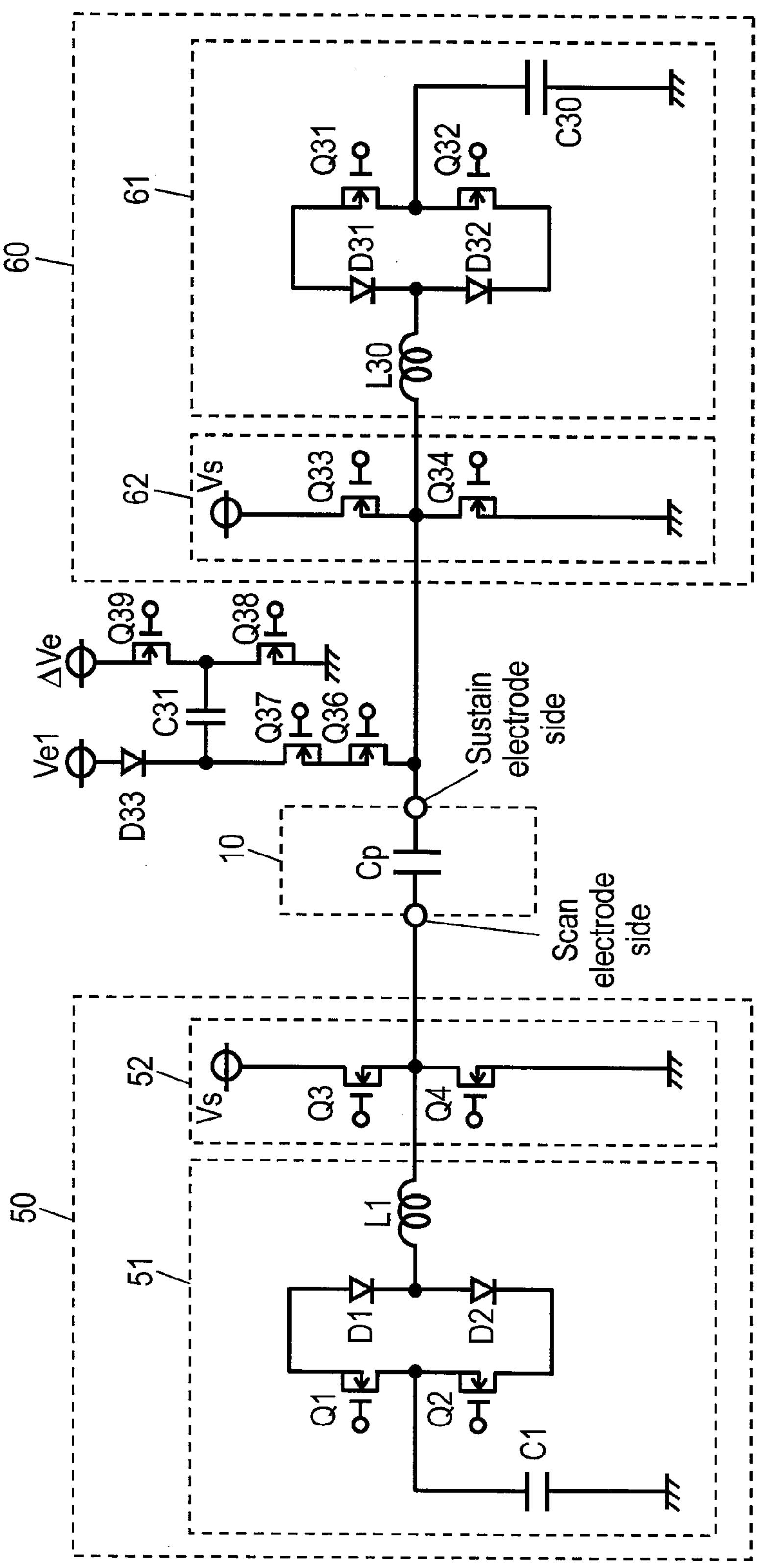
FIG. 11 is a circuit block diagram showing a sustain pulse generating circuit in accordance with the first exemplary embodiment of the present invention.

FIG. 11 is a circuit block diagram showing sustain pulse generating circuit 50 and sustain pulse generating circuit 60 in accordance with the first exemplary embodiment of the present invention. In FIG. 11, interelectrode capacitance of panel 10 is denoted by Cp. Furthermore, initializing waveform generating circuit 53 and scan pulse generating circuit 54 are omitted.

Sustain pulse generating circuit 50 includes power recovery circuit 51 and clamping circuit 52. Power recovery circuit 51 includes capacitor C1 for recovering electric power, switching element Q1, switching element Q2, back-flow preventing diode D1, back-flow preventing diode D2, and inductor L1 for resonance. Note here that capacitor C1 for recovering electric power has sufficiently larger capacitance than interelectrode capacitance Cp and is charged to about Vs/2 that is a half of voltage value Vs so that it acts as a power supply for power recovery circuit 51. Clamping circuit 52 includes switching element Q3 for clamping scan electrodes SC1-SCn to voltage Vs and switching element Q4 for clamping scan electrodes SC1-SCn to voltage of 0 (V), switching the switching elements provided inside on the basis of the timing signal output from timing generating circuit 45 so as to generate sustain pulse voltage Vs.

In sustain pulse generating circuit 50, when, for example, a sustain pulse waveform is allowed to rise, switching element Q1 is turned on so as to allow interelectrode capacitance Cp and inductor L1 provided in power recovery circuit 51 to resonate with each other. Then, electric power is supplied from power recovery capacitor C1 to scan electrodes SC1-SCn via switching element Q1, diode D1 and inductor L1. Then, at the time when voltage on scan electrodes SC1-SCn approaches voltage Vs, switching element Q3 is turned on and scan electrodes SC1-SCn are clamped to voltage Vs.

On the contrary, when a sustain pulse waveform is allowed to fall, switching element Q2 is turned on so as to allow interelectrode capacitance Cp and inductor L1 provided in the power recovery circuit to resonate with each other and to recover electric power to power recovery capacitor C1 from interelectrode capacitance Cp via inductor L1, diode D2, and switching element Q2. Then, at the time when the voltage on scan electrodes SC1-SCn approaches a voltage of 0 (V), switching element Q4 is turned on and the voltage on scan electrodes SC1-SCn is clamped to 0 (V).

Sustain pulse generating circuit 60 of sustain electrode drive circuit 44 has substantially the same configuration as that of sustain pulse generating circuit 50 of scan electrode drive circuit 43. That is to say, sustain pulse generating circuit 60 includes power recovery circuit 61 for recovering electric power at the time of driving sustain electrodes SU1-SUn and reusing it, and clamping circuit 62 for clamping sustain electrodes SU1-SUn to voltage Vs and a voltage of 0 (V). Then, sustain pulse generating circuit 60 is connected to sustain electrodes SU1-SUn that are one end of interelectrode capacitance Cp of panel 10.

Power recovery circuit 61 includes power recovery capacitor C30, switching element Q31, switching element Q32, back-flow preventing diode D31, back-flow preventing diode D32, and inductor L30 for resonance. Then, sustain pulse is allowed to rise and fall by allowing interelectrode capacitance Cp and inductor L30 to LC-resonate with each other. Clamping circuit 62 has switching element Q33 for clamping sustain electrodes SU1-SUn to voltage Vs and switching element Q34 for clamping sustain electrodes SU1-SUn to voltage of 0 (V). Then, clamping circuit 62 connects sustain electrodes SU1-SUn to voltage VS via switching element Q33 so as to clamp them to power supply Vs, and connects sustain electrodes SU1-SUn to the ground via switching element Q34 so as to clamp them to 0 (V).

Furthermore, sustain electrode drive circuit 44 includes power supply VE1, switching element Q36, switching element Q37, power supply ΔVE, back-flow preventing diode D33, capacitor C31, switching element Q38, and switching element Q39. Herein, power supply VE1 generates voltage Ve1 and applies voltage Ve1 to sustain electrodes SU1-SUn. Power supply ΔVE generates voltage ΔVe. Furthermore, sustain electrode drive circuit 44 includes capacitor C31 for pump-up and piles up voltage ΔVe to voltage Ve1 so as to obtain Ve2.

For example, at the timing when voltage Ve1 shown in FIG. 3 is applied, switching element Q36 and switching element Q37 are made to be conductive, and positive voltage Ve1 is applied to sustain electrodes SU1-SUn via diode D33, switching element Q36, and switching element Q37. Note here that at this time, switching element Q38 is made to be conductive, and is charged so that the voltage of capacitor C31 is voltage Ve1. Furthermore, at the timing when voltage Ve2 shown in FIG. 3 is applied, while switching element Q36 and switching element Q37 are remained to be conductive, switching element Q38 is blocked and switching element Q39 is made to be conductive. Thus, voltage ΔVe is superimposed to the voltage of capacitor C31, and voltage (Ve1+ΔVe), that is, voltage Ve2, is applied to sustain electrodes SU1-SUn. At this time, by the action of back-flow preventing diode D33, an electric current from capacitor C31 to power supply VE1 is blocked.

Note here that these switching elements can be formed by using generally known elements such as MOSFET, IGBT, and the like.

Since an extremely large amount of electric current flows in switching elements Q3, Q4, and Q13 shown in FIG. 10, these switching elements use a plurality of FET, IGBT, and the like, which are connected in parallel to each other, so as to reduce impedance.

Note here that the cycle of LC resonance between inductor L1 of power recovery circuit 51 and interelectrode capacitance Cp of panel 10, and the cycle of LC resonance (hereinafter, referred to as "resonance cycle") between inductor L30 of power recovery circuit 61 and interelectrode capacitance Cp can be calculated from formula: "$2\pi\,(LCp)^{1/2}$" when the inductances of inductor L1 and inductor L30 are denoted by L, respectively. Then, in this exemplary embodiment, inductors L1 and L30 are set so that the resonance cycles of power recovery circuits 51 and 61 are about 1500 nsec. However, this value is just an example in this exemplary embodiment, and may be optimized according to characteristics of the panel, specifications of the plasma display device, or the like.

Figure 12:
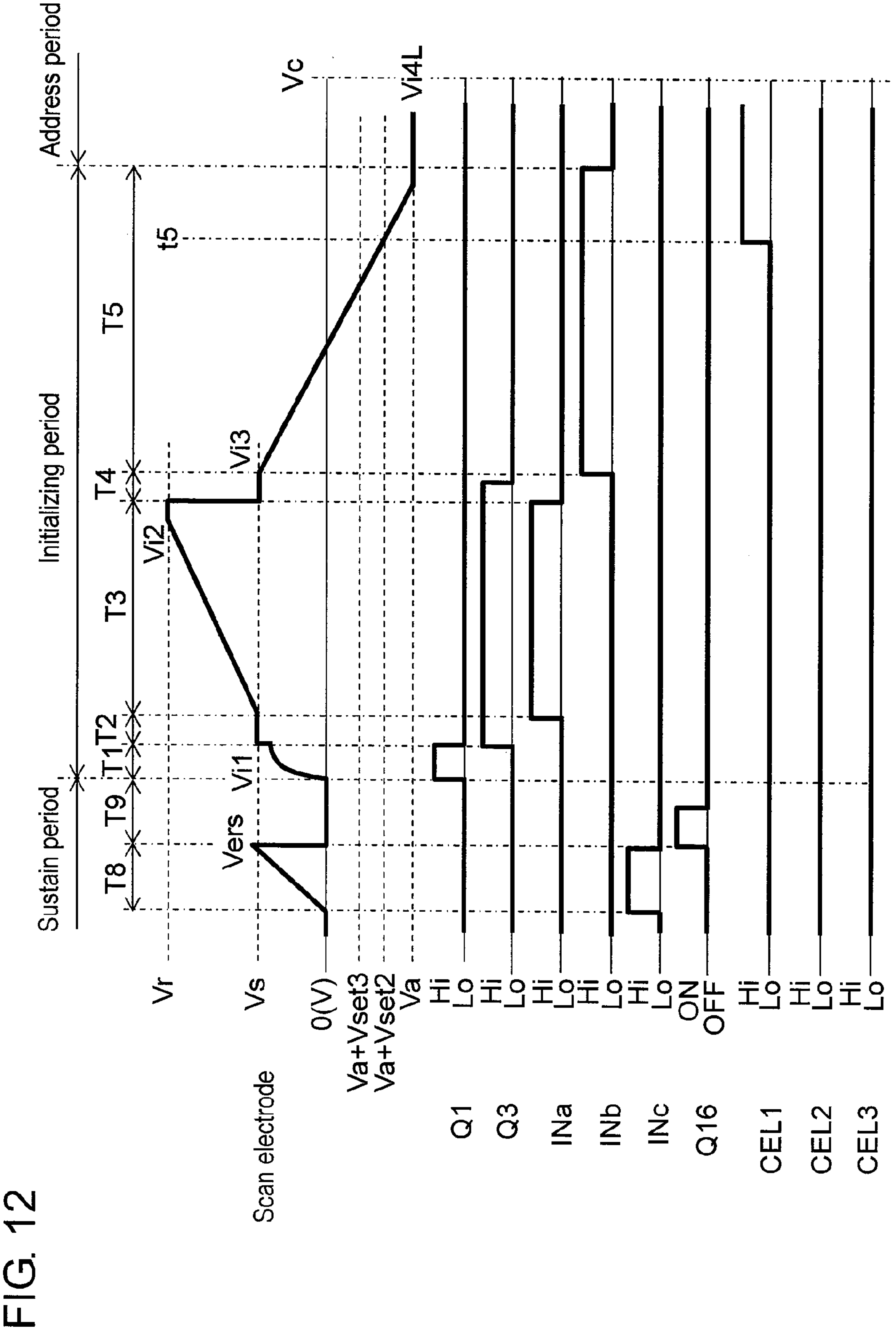
FIG. 12 is a timing chart to illustrate one example of an operation of a scan electrode drive circuit in an all-cell initializing period in accordance with the first exemplary embodiment of the present invention.
Figure 13:
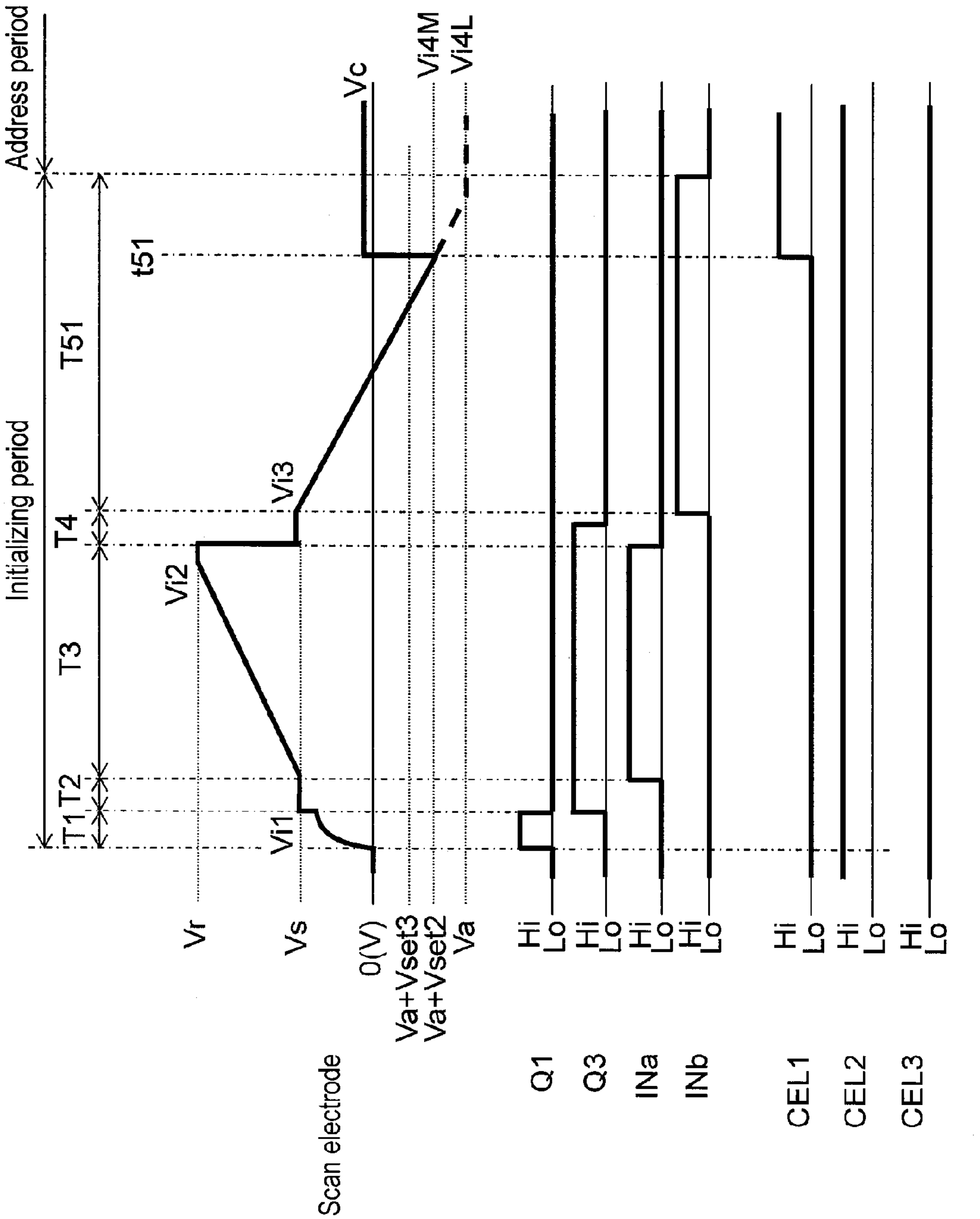
FIG. 13 is a timing chart to illustrate another example of an operation of a scan electrode drive circuit in an all-cell initializing period in accordance with the first exemplary embodiment of the present invention.
Figure 14:
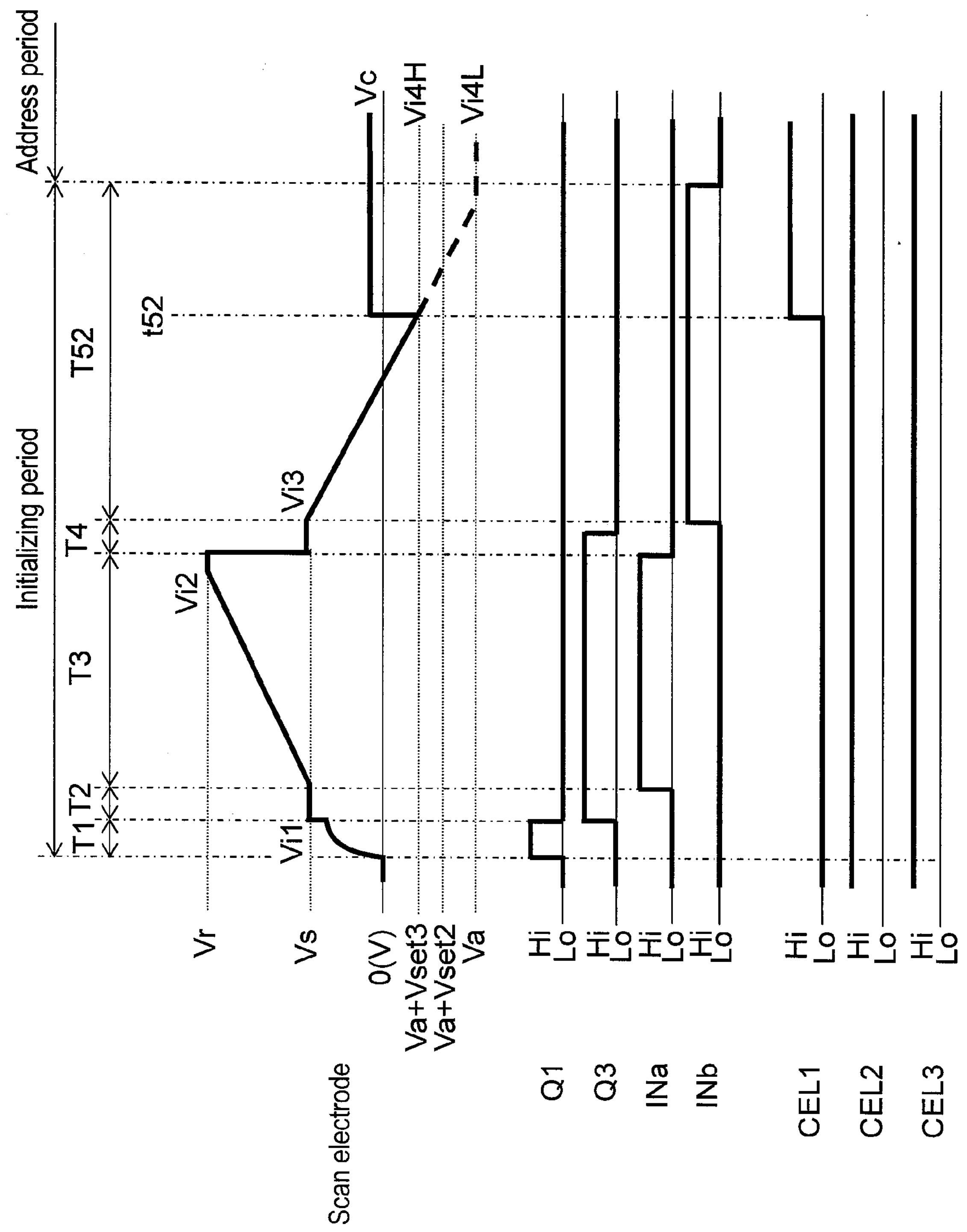
FIG. 14 is a timing chart to illustrate a further example of an operation of a scan electrode drive circuit in an all-cell initializing period in accordance with the first exemplary embodiment of the present invention.

Next, an operation of initializing waveform generating circuit 53 and a method for controlling initializing voltage Vi4 are described with reference to FIGS. 12 to 14. Firstly, an operation for setting initializing voltage Vi4 to Vi4L is described with reference to FIG. 12. Next, an operation for setting initializing voltage Vi4 to Vi4M is described with reference to FIG. 13. Then, an operation for setting initializing voltage Vi4 to Vi4H is described with reference to FIG. 14. In FIGS. 12 to 14, a method for controlling initializing voltage Vi4 is described taking a drive waveform at the time of the all-cell initializing operation as an example. However, also in the selective initializing operation, initializing voltage Vi4 can be controlled by same controlling method.

In FIGS. 12 to 14, a drive voltage waveform carrying out an all-cell initializing operation is divided into five periods denoted by periods T1 to T5, and each period is described. In the description, voltage Vi1 and voltage Vi3 are assumed to be equal to voltage Vs, voltage Vi2 is assumed to be equal to voltage Vr, voltage Vi4L is assumed to be equal to negative voltage Va, Vi4M is assumed to be equal to voltage (Va+Vset2) obtained by superimposing voltage Vset2 to negative voltage Va, and Vi4H is assumed to be equal to voltage (Va+Vset3) obtained by superimposing voltage Vset3 to negative voltage Va. Furthermore, in the drawing, as to the input signals CEL1 and CEL2 to AND gate AG and switching signal CEL3, "1" is denoted by "Hi," and "0" is denoted by "Lo."

FIG. 12 is a timing chart to illustrate one example of an operation of scan electrode drive circuit 43 in an all-cell initializing period in accordance with the first exemplary embodiment of the present invention. Herein, in order to set initializing voltage Vi4 to Vi4L (herein, equal to negative voltage Va), switching signal CEL2 is sustained to be "0" in periods T1 to T5. Furthermore, in order to show the difference between the generation of the erase ramp waveform voltage and the generation of the upward ramp waveform voltage, FIG. 12 shows operations in periods T8 to T9 in which the erase ramp waveform voltage is generated.

Furthermore, although not shown, in the sustain period and the initializing period, in order to make the output from sustain pulse generating circuit 50 and initializing waveform generating circuit 53 be an output of scan electrode drive circuit 43, switching element Q21 is sustained to be off. Furthermore, although not shown, in switching element Q13 constituting an isolation circuit, a signal having a polarity opposite to a signal input into input terminal INb is input. Therefore, in the period in which input terminal INb is "Lo", switching element Q13 is on. Furthermore, in the period in which input terminal INb is "Hi", switching element Q13 is off. However, a parasitic diode called a body diode is generated in MOSFET in the antiparallel direction to a part in which a switching operation is carried out. Herein, the antiparallel direction signifies that a direction, which is parallel to the portion in which a switching operation is carried out and which is opposite to the direction in which an electric current flows by the switching operation, becomes a forward direction. As a result, even if switching element Q13 is turned off, third Miller integrating circuit 57 can apply a downward ramp waveform voltage to scan electrodes SC1-SCn via this body diode.

Firstly, an operation for generating an erase ramp waveform voltage in the end of the sustain period is described.

(Period T8)

In period T8, input terminal INc is set to "Hi." Thus, a constant electric current flows from resistor R12 to capacitor C11, a source voltage of switching element Q15 increases in a ramp-shaped manner, and an output voltage of scan electrode drive circuit 43 starts to increase in a ramp-shaped manner with a steeper gradient as compared with an upward ramp waveform voltage. Thus, an erase ramp waveform voltage that is a second inclined waveform voltage increasing from 0 (V) as the base potential toward voltage Vers is generated. Then, while this erase ramp waveform voltage increases, the voltage difference between the voltages on scan electrode SCi and on sustain electrode SUi exceeds the discharge start voltage. At this time, in this exemplary embodiment, each numerical value is set so that discharge is generated only between scan electrode SCi and sustain electrode SUi. For example, sustain pulse voltage Vs is set to about 210 (V), voltage Vers is set to about 213 (V), and the gradient of the erase ramp waveform voltage is set to about 10 V/μsec. Thus, feeble discharge can be generated between scan electrode SCi and sustain electrode SUi, and this feeble discharge can be continued while the erase ramp waveform voltage increases.

At this time, when momentary strong discharge due to a rapid voltage change is generated, a large amount of charged particles generated by the strong discharge form large wall charge in order to release the rapid change of the voltage, thus excessively erasing the wall voltage formed by immediately preceding sustain discharge. Furthermore, in a panel having a larger screen, a higher resolution and an increased drive impedance, waveform distortion such as ringing tends to occur in a drive waveform generated by the drive circuit. Therefore, in the drive waveform for causing narrow width erase discharge mentioned above, strong discharge by the waveform distortion may occur.

However, this exemplary embodiment has a configuration in which feeble erase discharge is continuously generated between scan electrode SCi and sustain electrode SUi by an erase ramp waveform voltage that gradually increases the applied voltage. Therefore, even in a panel having a larger screen, a higher resolution and an increased drive impedance, erase discharge can be generated stably. The wall voltages on scan electrode SCi and on sustain electrode SUi can be adjusted to a state suitable for stably causing a subsequent address.

Although not shown in the drawing, at this time, since data electrodes D1-Dm are maintained to 0 (V), a positive wall voltage is formed on data electrodes D1-Dm.

(Period T9)

When a drive voltage waveform output from initializing waveform generating circuit 53 reaches voltage Vers, switching element Q16 is turned on, an electric current input into input terminal INc for operating second Miller integrating circuit 56 is pulled out by switching element Q16 and second Miller integrating circuit 56 stops its operation.

Thus, an erase ramp waveform voltage that is a second inclined waveform voltage increasing from 0V as a base potential toward voltage Vers is generated.

Next, an operation in the initialization period (hereinafter, all-cell an initializing period) of the subsequent subfield is described.

(Period T1)

Firstly, switching element Q1 of sustain pulse generating circuit 50 is turned on. Then, interelectrode capacitance Cp and inductor L1 resonate with each other. A voltage of scan electrodes SC1-SCn starts to increase from power recovery capacitor C1 via switching element Q1, diode D1, and inductor L1.

(Period T2)

Next, switching element Q3 of sustain pulse generating circuit 50 is turned on. Then, voltage Vs is applied to scan electrodes SC1-SCn via switching element Q3, and the potential of scan electrodes SC1-SCn is voltage Vs (which is equal to voltage Vi1 in this exemplary embodiment).

(Period T3)

Next, input terminal INa of the Miller integrating circuit that generates an upward ramp waveform voltage is set to "Hi." Specifically, for example, a voltage of 15 (V) is applied to input terminal INa. Then, a constant electric current flows from resistor R10 toward capacitor C10 and a source voltage of switching element Q11 increases in a ramp-shaped manner and an output voltage of scan electrode drive circuit 43 starts to increase in a ramp-shaped manner. This voltage increase continues while input terminal INa is "Hi."

When this output voltage is increased to voltage Vr (which is equal to Vi2 in this exemplary embodiment), then input terminal INa is set to "Lo." Specifically, for example, a voltage of 0 (V) is applied to input terminal INa.

In this way, the upward ramp waveform voltage gently increasing from voltage Vs (which is equal to Vi1 in this exemplary embodiment) that is not more than the discharge start voltage toward voltage Vr (which is equal to Vi2 in this exemplary embodiment) that is more than the discharge start voltage is applied to scan electrodes SC1-SCn.

(Period T4)

When input terminal INa is set to "Lo," the voltage of scan electrodes SC1-SCn is reduced to voltage Vs (which is equal to voltage Vi3 in this exemplary embodiment). Thereafter, switching element Q3 is turned off.

(Period T5)

Next, input terminal INb of the Miller integrating circuit that generates a downward ramp waveform voltage is set to "Hi." Specifically, for example, a voltage of 15 (V) is applied to input terminal INb. Then, a constant electric current flows from resistor R11 toward capacitor C12, and a drain voltage of switching element Q14 decreases in a ramp-shaped manner, and an output voltage of scan electrode drive circuit 43 starts to decrease in a ramp-shaped manner. Then, immediately before the initializing period is finished, input terminal INb is set to "Lo." Specifically, for example, a voltage of 0 (V) is applied to input terminal INb.

Note here that in period T5, switching element Q13 is turned off. However, the Miller integrating circuit that generates a downward ramp waveform voltage can reduce the output voltage of scan electrode drive circuit 43 via a body diode of switching element Q13.

At this time, comparator CP compares this downward ramp waveform voltage with voltage (Va+Vset2) obtained by adding voltage Vset2 to voltage Va. An output signal from comparator CP is changed from "0" to "1" at time t5 when the downward ramp waveform voltage becomes not more than voltage (Va+Vset2). However, during periods T1 to T5, since switching signal CEL2 is sustained to be "0," "0" is output from AND gate AG. Therefore, from scan pulse generating circuit 54, a downward ramp waveform voltage, in which initializing voltage Vi4 is set to negative voltage Va, that is, Vi4L, is output as it is.

Note here that since Vi4L is made to be equal to negative voltage Va, in a waveform shown in FIG. 12, the voltage is maintained for a predetermined time period after the downward ramp waveform voltage reaches Vi4L. However, such a waveform is obtained just because of the configuration of the circuit shown in FIG. 10. This exemplary embodiment is not limited to this waveform or the circuit configuration shown in FIG. 10, and a configuration in which the voltage is changed to voltage Vc immediately after the voltage reaches Vi4L may be employed.

As mentioned above, scan electrode drive circuit 43 can generate an upward ramp waveform voltage that is the first inclined waveform voltage gently increasing from voltage Vi1 that is not more than the discharge start voltage toward voltage Vi2 that is more than the discharge start voltage with respect to scan electrodes SC1-SCn. Thereafter, scan electrode drive circuit 43 can generate the downward ramp waveform voltage, gently decreasing from voltage Vi3 toward initializing voltage Vi4 (Vi4L) and apply it to scan electrodes SC1-SCn.

Although not shown, after the initializing period is finished, in the subsequent address period, switching element Q21 is maintained to be on. Thus, a voltage input into one terminal of comparator CP is negative voltage Va, and output signal CEL1 from comparator CP is maintained to be "1." Thus, the output from AND gate AG is sustained to be "1," and voltage Vc, which is obtained by superimposing voltage Vscn to negative voltage Va, is output from scan pulse generating circuit 54. Then, when switching signal CEL2 is set to "0" at a timing of generating a negative scan pulse voltage, the output signal of AND gate AG is set to "0" and negative voltage Va is output from scan pulse generating circuit 54. Thus, a negative scan pulse voltage in the address period can be generated.

Next, an operation of setting initializing voltage Vi4 to Vi4M is described with reference to FIG. 13. FIG. 13 is a timing chart to illustrate another example of an operation of a scan electrode drive circuit 43 in an all-cell initializing period in accordance with the first exemplary embodiment of the present invention. In order to make initializing voltage Vi4 to Vi4M, in periods T1 to T51, switching signal CEL2 is set to "1" and switching signal CEL3 is set to "0." Furthermore, in FIG. 13, since the operation in periods T1 to T4 and the operations in periods T8 and T9 are the same as the operations shown in FIG. 12, herein, an operation of period T51 that is different from that of period T5 shown in FIG. 12 is described.

(Period T51)

In period T51, input terminal INb of a Miller integrating circuit generating a downward ramp waveform voltage is set to "Hi." Specifically, for example, voltage 15 (V) is applied to input terminal INb. Then, a constant current flows from resistor R11 toward capacitor C12, a drain voltage of switching element Q14 decreases in a ramp-shaped manner, and an output voltage of scan electrode drive circuit 43 also starts to decrease in a ramp-shaped manner.

At this time, since switching signal CEL3 is "0," in comparator CP, this downward ramp waveform voltage is compared with voltage (Va+Vset2) obtained by adding voltage Vset2 to voltage Va. Therefore, an output signal from comparator CP is switched from "0" to "1" at time t51 when the downward ramp waveform voltage becomes not more than voltage (Va+Vset2). At this time, since switching signal CEL2 is "1", both inputs of AND gate AG are "1", and "1" is output from AND gate AG. Thus, from scan pulse generating circuit 54, voltage Vc obtained by superimposing voltage Vscn to negative voltage Va is output. Therefore, the lowest voltage in the downward ramp waveform voltage can be set to voltage (Va+Vset2), that is, Vi4M. Note here that input terminal INb is set to "Lo" during the time from the time when the output from scan pulse generating circuit 54 becomes voltage Vc to the time when the initializing period is ended.

As mentioned above, scan electrode drive circuit 43 generates an upward ramp waveform voltage that is a first inclined waveform voltage gently increasing from voltage Vi1 that is not more than a discharge start voltage toward voltage Vi2 that is more than a discharge start voltage with respect to scan electrode SC1-SCn. Thereafter, scan electrode drive circuit 43 generates a downward ramp waveform voltage gently decreasing from voltage Vi3 to initializing voltage Vi4 (Vi4M), and can apply it to scan electrodes SC1-SCn.

Next, an operation in which initializing voltage Vi4 is set to Vi4H is described. FIG. 14 is a timing chart to illustrate a further example of an operation of scan electrode drive circuit 43 in an all-cell initializing period in accordance with the first exemplary embodiment of the present invention. Herein, in order to set initializing voltage Vi4 to Vi4H, in periods T1 to T52, switching signal CEL2 is set to "1" and switching signal CEL3 is set to "1". Also in FIG. 14, since the operations of periods T1 to T4 and operations of periods T8 and T9 are the same as the operations shown in FIG. 12, herein, period T52 that is different from the operation in period T5 is described.

(Period T52)

Input terminal INb of the Miller integrating circuit that generates a downward ramp waveform voltage is set to "Hi." Specifically, for example, a voltage of 15 (V) is applied to input terminal INb. Then, a constant electric current flows from resistor R11 toward capacitor C12, and a drain voltage of switching element Q14 decreases in a ramp-shaped manner, and an output voltage of scan electrode drive circuit 43 starts to decrease in a ramp-shaped manner.

At this time, since switching signal CEL3 is "1", comparator CP compares this downward ramp waveform voltage with voltage (Va+Vset3) obtained by adding voltage Vset3 to voltage Va. Therefore, an output signal from comparator CP changes from "0" to "1" at time t52 when this downward ramp waveform voltage becomes not more than voltage (Va+Vset3). At this time, since switching signal CEL2 is "1", both inputs of AND gate AG are "1" and "1" is output from AND gate AG. Thus, voltage Vc obtained by superimposing voltage Vscn to negative voltage Va is output from scan pulse generating circuit 54. Therefore, the lowest voltage in this downward ramp waveform voltage can be set to voltage (Va+Vset3), that is, Vi4H. Note here that input terminal INb is set to "Lo" at any time from the time when the output of scan pulse generating circuit 54 is voltage Vc to the time when the initializing period is finished.

As mentioned above, scan electrode drive circuit 43 generates an upward ramp waveform voltage that is a first inclined waveform voltage gently increasing from voltage Vi1 that is not more than discharge start voltage to voltage Vi2 that is more than the discharge start voltage with respect to scan electrode SC1-SCn. Thereafter, scan electrode drive circuit 43 can generate a downward ramp waveform voltage gently decreasing from voltage Vi3 toward initializing voltage Vi4 (Vi4H) and apply it to scan electrodes SC1-SCn.

Since a configuration in which switching circuits OUT1-OUTn are changed on the basis of the comparison results obtained by comparator CP is employed, FIGS. 13 and 14 show a waveform in which immediately after the downward ramp waveform voltage reaches Vi4M or Vi4H, the voltage is changed to voltage Vc. However, this exemplary embodiment is not particularly limited to this waveform. A configuration, in which the voltage is maintained for a predetermined time after the voltage reaches to Vi4M or Vi4H, may be employed.

In this way, in this exemplary embodiment, by making scan electrode drive circuit 43 have a circuit configuration as shown in FIG. 10, the lowest voltage in the gently decreasing downward ramp waveform voltage, that is, the voltage of initializing voltage Vi4 can be easily switched at Vi4L, Vi4M, and Vi4H.

Note here that in this exemplary embodiment, a control of initializing voltage Vi4 in the all-cell initializing operation is described. In the generation of a downward ramp waveform voltage, the selective initializing operation can be carried out in the same way as mentioned above except that the upward ramp waveform voltage is not generated, and a control of initializing voltage Vi4 can be carried in the same way.

As described above, this exemplary embodiment has a configuration in which initializing voltage Vi4 is switched at Vi4L, Vi4M having a higher voltage value than Vi4L, Vi4H having a higher voltage value than Vi4M. In the configuration, initializing voltage Vi4 is changed according to the temperature of panel 10. That is to say, when the temperature of panel 10 detected by panel temperature detecting circuit 46 is determined to be a low temperature (in this exemplary embodiment, less than 20° C.), initializing voltage Vi4 in the first SF is set to Vi4M and initializing voltage Vi4 in the second to tenth SFs is set to Vi4L so as to generate a downward ramp waveform voltage. Furthermore, when the temperature of panel 10 is determined to be a middle temperature (in this exemplary embodiment, not less than 20° C. and less than 55° C.), initializing voltage Vi4 in all subfields is set to Vi4M to generate a downward ramp waveform voltage. Furthermore, when the temperature of panel 10 is determined to be a high temperature (in this exemplary embodiment, 55° C. or more), initializing voltage Vi4 in the first to fourth SFs is set to Vi4M and initializing voltage Vi4 in the fifth to tenth SFs is set to Vi4H to generate a downward ramp waveform voltage. Thus, even in a panel having a high resolution, address discharge can be generated stably without increasing the voltage necessary to generate address discharge. It is possible to improve the quality of image display.

Second Exemplary Embodiment

The first exemplary embodiment 1 is characterized in that initializing voltage Vi4 is switched at Vi4L, Vi4M and Vi4H for every subfield according to the total number of sustain pulses in the sustain period and the temperature of panel 10. However, the second exemplary embodiment is characterized in that initializing voltage Vi4 is switched at Vi4L, Vi4M and Vi4H according to only the total number of sustain pulses of the sustain period. Therefore, the description of the configuration and operation that are the same as those in the first exemplary embodiment is omitted herein.

Figure 15:
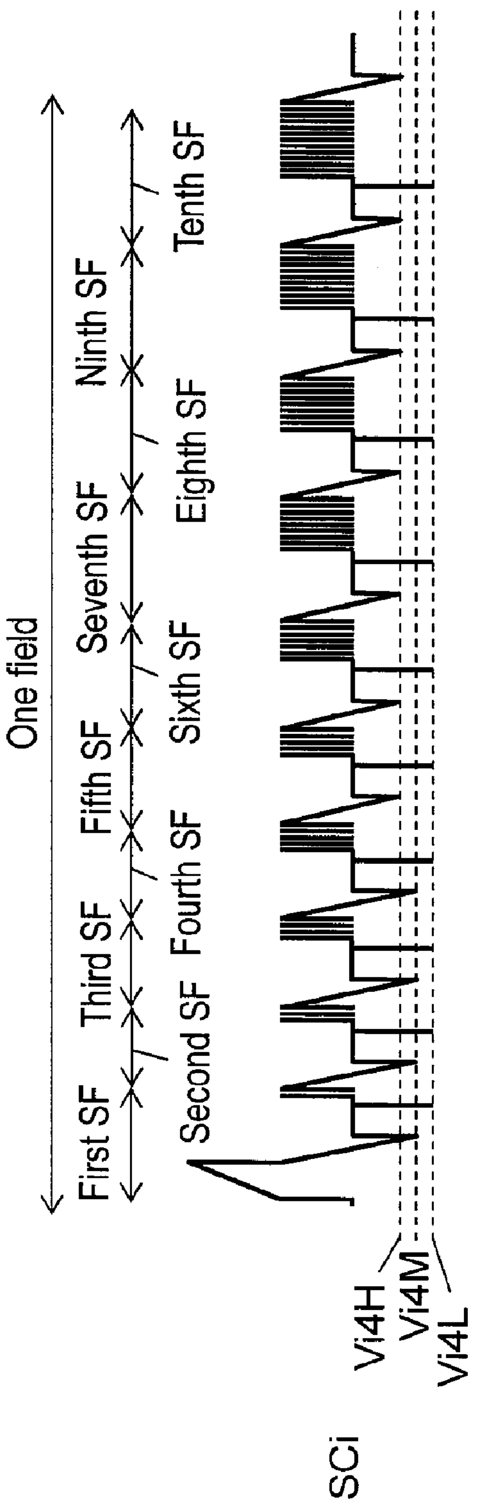
FIG. 15 shows one example of a configuration of a subfield in accordance with a second exemplary embodiment of the present invention.

FIG. 15 shows one example of a configuration of a subfield in accordance with the second exemplary embodiment of the present invention. For example, as shown in FIG. 15, regardless of the temperature of the panel, in the initializing period of a subfield in which the total number of sustain pulses in the immediately preceding subfield is less than 20 (herein, second SF to fourth SF) and in the initializing period of the all-cell initializing subfield (herein, first SF), initializing voltage Vi4 is set to Vi4M. Furthermore, in the initializing period of a subfield in which the total number of sustain pulses in the immediately preceding subfield is not less than 20 (herein, fifth to tenth SFs), initializing voltage Vi4 is set to Vi4H and a downward ramp waveform voltage may be generated. Thus, in the subfield in which sustain discharge is sufficiently generated and sufficient priming particles are generated in the immediately preceding subfield, since initializing voltage Vi4 is increased (Vi4H), an effect capable of reducing necessary scan pulse voltage Va and stably generating address discharge can be obtained. Note here that a plasma display device in this exemplary embodiment may have a configuration of a circuit block of plasma display device 1 shown in FIG. 9 that does not includes panel temperature detecting circuit 46.

Third Exemplary Embodiment

The first exemplary embodiment is characterized in that initializing voltage Vi4 is switched at Vi4L, Vi4M and Vi4H for every subfield according to the total number of sustain pulses in the sustain period and the temperature of panel 10. However, the third exemplary embodiment is characterized in that initializing voltage Vi4 is switched at Vi4L, Vi4M and Vi4H according to only the temperature of panel 10. Therefore, the description of the configuration and operation that are the same as those in the first exemplary embodiment is omitted herein.

Figure 16A:
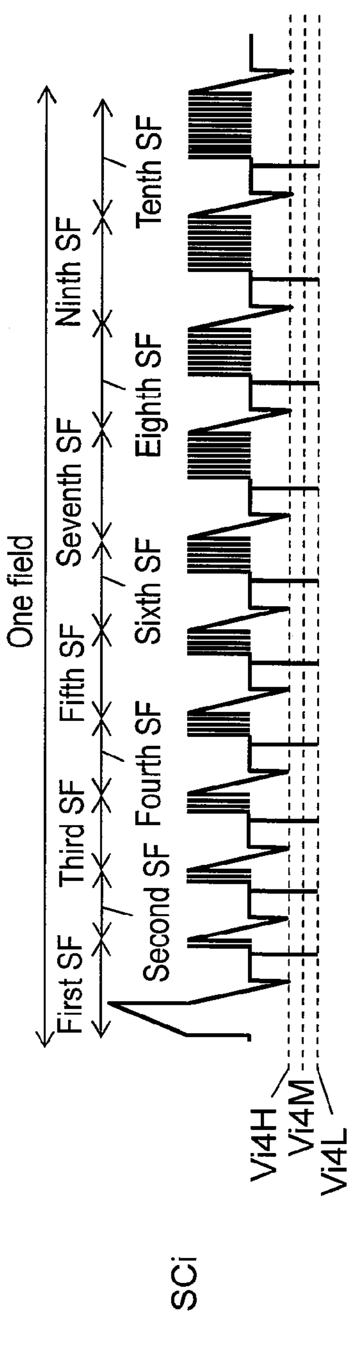
FIG. 16A shows one example of a configuration of a subfield in accordance with a third exemplary embodiment of the present invention.
Figure 16B:
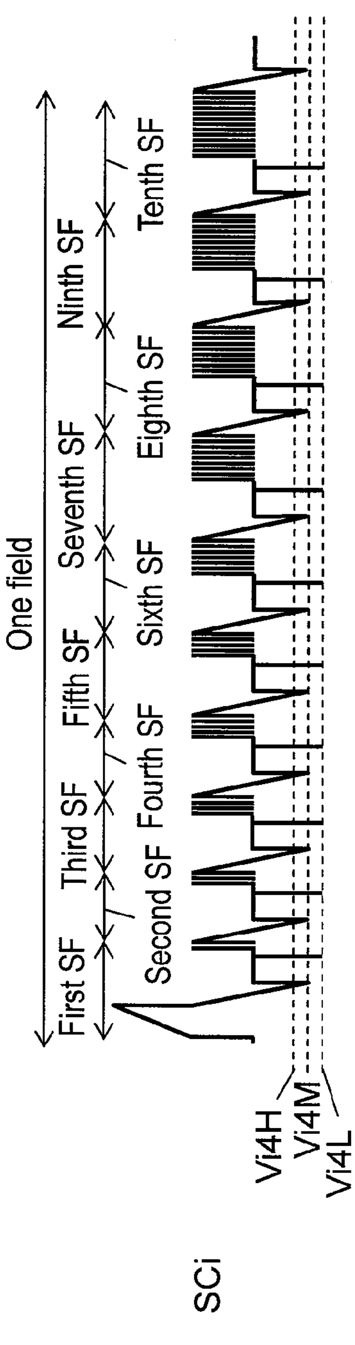
FIG. 16B shows one example of a configuration of a subfield in accordance with the third exemplary embodiment of the present invention.
Figure 16C:
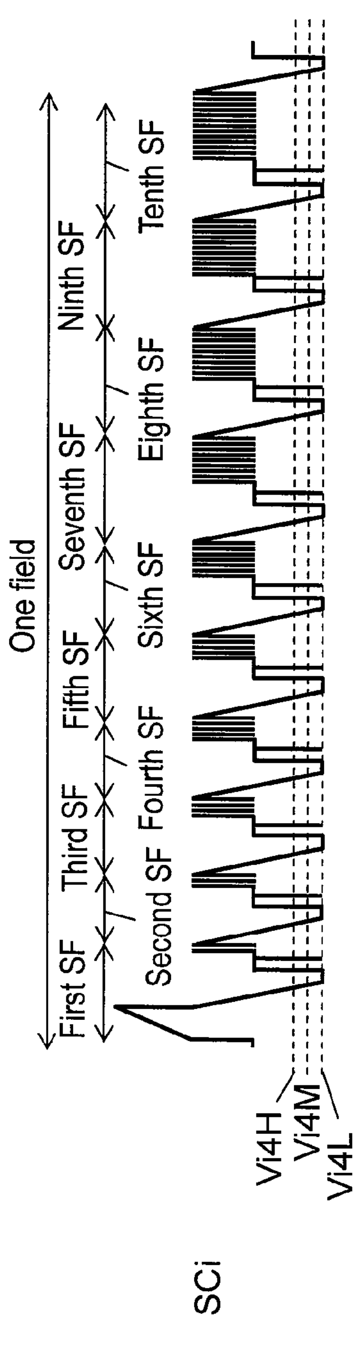
FIG. 16C shows one example of a configuration of a subfield in accordance with the third exemplary embodiment of the present invention.

FIGS. 16A, 16B and 16C are views showing one example of the subfield configuration in the third exemplary embodiment of the present invention. For example, when panel temperature detecting circuit 46 determines that the temperature of panel 10 is a high temperature (not less than 55° C.), as shown in FIG. 16A, initializing voltage Vi4 is set to Vi4H in the initializing period of all the subfields to generate a downward ramp waveform voltage. Furthermore, when panel temperature detecting circuit 46 determines that the temperature of panel 10 is a middle temperature (not less than 20° C. and less than 55° C.), as shown in FIG. 16B, initializing voltage Vi4 is set to Vi4M in the initializing period of all the subfields to generate a downward ramp waveform voltage. Furthermore, when panel temperature detecting circuit 46 determines that the temperature of panel 10 is a low temperature (less than 20° C.), as shown in FIG. 16C, initializing voltage Vi4 may be set to Vi4L in the initializing period of all the subfields to generate a downward ramp waveform voltage.

That is to say, panel temperature detecting circuit 46 compares the detected temperature with a predetermined low-temperature threshold value and a predetermined high-temperature threshold value. Then, scan electrode drive circuit 43 sets the lowest voltage to a third voltage and generates a downward inclined waveform voltage when the temperature detected by temperature detecting circuit 46 is determined to be not less than the high-temperature threshold value. Furthermore, scan electrode drive circuit 43 sets the lowest voltage to a first voltage and generates a downward inclined waveform voltage when the temperature detected by panel temperature detecting circuit 46 is determined to be less than the low-temperature threshold value. Furthermore, scan electrode drive circuit 43 may set the lowest voltage to a second voltage and generate a downward inclined waveform voltage when the temperature detected by panel temperature detecting circuit 46 is determined to be not less than the low-temperature threshold value and less than the high-temperature threshold value.

As mentioned above, when the temperature of panel 10 is low, scan pulse voltage Va necessary to generate stable address discharge becomes low. Furthermore, as mentioned above, when the temperature of panel 10 is high, scan pulse voltage Va necessary to generate stable address discharge becomes high. However, when the temperature of panel 10 is low, initializing voltage Vi4 can be set to be low so as to reduce address pulse voltage Vd necessary to generate stable address discharge. Furthermore, when the temperature of panel 10 is high, initializing voltage Vi4 can be set to be high so as to reduce the necessary scan pulse voltage. As a result, an effect of stably generating address discharge can be obtained.

Note here that, for example, only in the all-cell initializing subfield, initializing voltage Vi4 may be set to Vi4M to generate a downward ramp waveform voltage regardless of the temperature of panel 10. That is to say, scan electrode drive circuit 43 may set the lowest voltage to Vi4M that is the second voltage and generate a downward inclined waveform voltage in the subfield in which the first inclined waveform voltage is generated.

Figure 17:
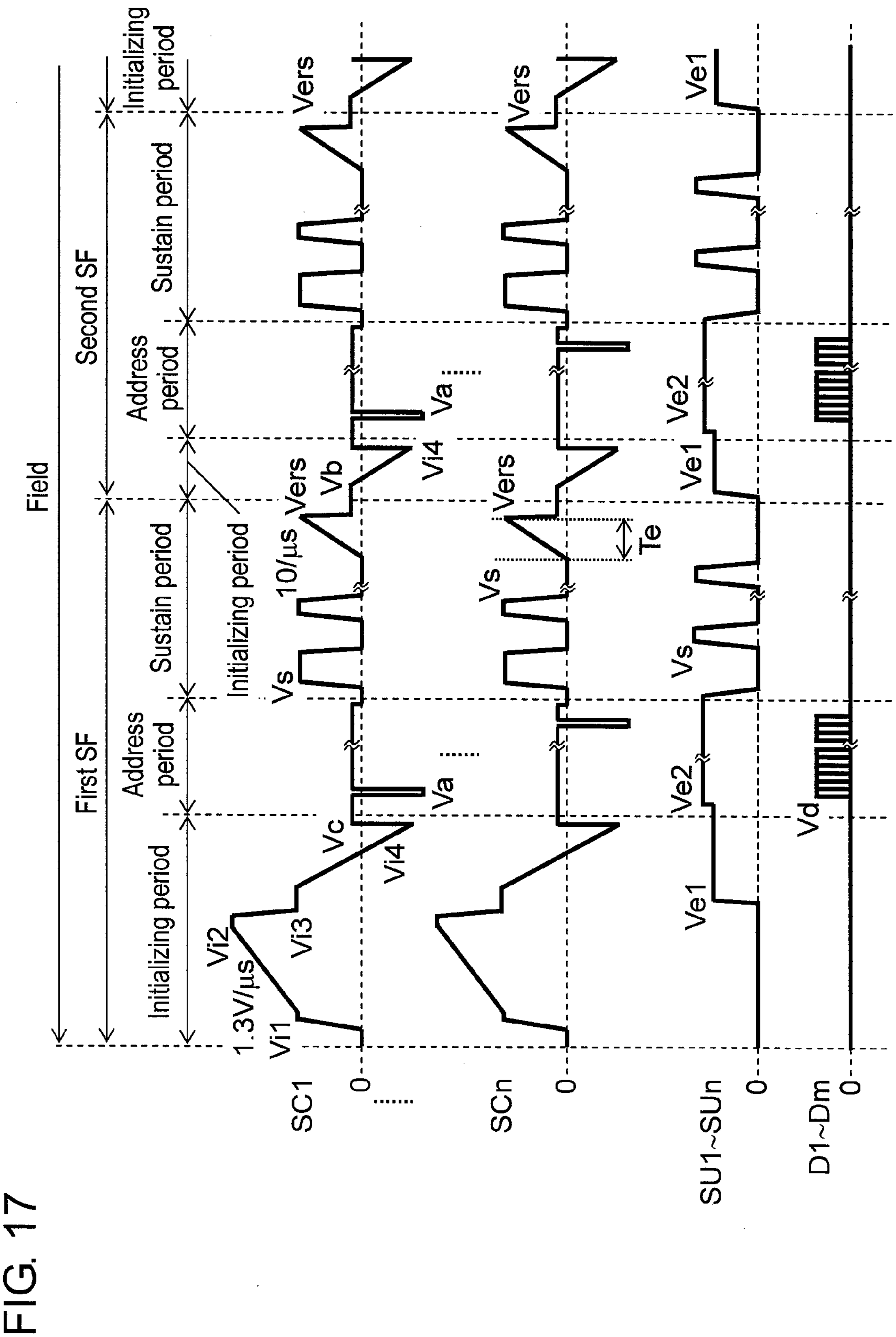
FIG. 17 is a waveform diagram showing another example of a drive voltage waveform in accordance with the exemplary embodiment of the present invention.

Note here that the exemplary embodiment of the present invention describes a configuration in which the erase ramp waveform voltage is reduced to 0 (V) as the base potential immediately after the increasing voltage reaches voltage Vers. However, in order to prevent the above-mentioned abnormal discharge, it is desirable that a decreasing endpoint potential is set to be not more than 70% of voltage Vers. FIG. 17 is a waveform showing another example of a drive voltage waveform in accordance with the exemplary embodiment of the present invention. For example, as shown in this drawing, immediately after the erase ramp waveform voltage reaches voltage Vers, it is reduced to voltage Vb. Thus, even if voltage Vb is sustained for a predetermined period, the above-mentioned effect can be obtained while the above-mentioned abnormal discharge is prevented. Herein, voltage Vb is a voltage of not more than "Vers×0.7". Furthermore, in the exemplary embodiment of the present invention, the lower limit voltage value of the decreasing endpoint potential is set to 0 (V) as the base potential. However, this lower limit value is just a value that is set in order to carry out selective initializing operation smoothly in the subsequent downward ramp waveform voltage. In this exemplary embodiment, this lower limit voltage value is not limited to the above-mentioned value and it may be suitably set in the range in which an operation following the erasing operation can be carried out smoothly.

Note here that in the exemplary embodiment of the present invention, scan electrode drive circuit 43 shown in FIG. 10 is just one configuration example and any circuit configuration may be employed as long as the same operation can be realized. Furthermore, a circuit for generating the erase ramp waveform voltage is also just one example and it may be replaced by the other circuit for realizing the same operation.

Note here that the exemplary embodiment of the present invention can be applied to a method for driving a panel by so called two-phase driving and the same effect as mentioned above can be obtained. In the method for driving a panel by the two-phase driving, scan electrodes SC1-SCn are divided into a first scan electrode group and a second scan electrode group. The address period includes a first address period of sequentially applying a scan pulse to each of the scan electrodes belonging to the first scan electrode group and a second address period of sequentially applying a scan pulse to each of the scan electrodes belonging to the second scan electrode group. Then, in at least one of the first address period and the second address period, to the scan electrode belonging to the scan electrode group to which a scan pulse is applied, a scan pulse, changing from the second voltage that is higher than the scan pulse voltage to the scan pulse voltage and again changing to the second voltage, is sequentially applied. On the other hand, to the scan electrode belonging to the scan electrode group to which a scan pulse is not applied, any of the third voltage that is higher than the scan pulse voltage and the fourth voltage that is higher than the second voltage and the third voltage is applied. Thus, while a scan pulse voltage is applied to at least adjacent scan electrodes, the third voltage can be applied.

Note here that the exemplary embodiments of the present invention describe a configuration in which an erase ramp waveform voltage is applied to scan electrodes SC1-SCn. However, when an electrode for applying the last sustain pulse is scan electrodes SC1-SCn, an erase ramp waveform voltage may be applied to sustain electrodes SU1-SUn. However, it is desirable that the exemplary embodiments of the present invention have a configuration in which an electrode for applying the last sustain pulse is sustain electrodes SU1-SUn and an erase ramp waveform voltage is applied to scan electrodes SC1-SCn.

Note here that the exemplary embodiments of the present invention describe a configuration in which power recovery circuits 51 and 61 share one inductor for rising and falling of the sustain pulse. However, a configuration, in which a plurality of inductors are used and different inductors are used between rising and falling in the sustain pulse, may be employed. In this case, a configuration, in which an inductor is set so that the resonance cycle becomes about 1500 nsec in the above-mentioned power recovery circuit 51 and power recovery circuit 61, may be applied to an inductor used for falling. Furthermore, the inductor used for rising may have a resonance cycle different from that of falling, for example, a resonance cycle of about 1200 nsec.

Note here that specific numeric values shown in the exemplary embodiments of the present invention, for example, a voltage value of voltage Vers, a gradient of an erase pulse waveform voltage, and the like, are set on the basis of the property of a 42-inch panel having 1080 display electrode pairs. Therefore, the above-mentioned numeric values are just one example of the exemplary embodiment. The exemplary embodiments of the present invention are not limited to these numeric values and it is desirable that the values may be optimized according to characteristics of the panel, specifications of the plasma display device, or the like. Furthermore, these numeric values are assumed to permit variation in the range in which the above-mentioned effect can be obtained.

INDUSTRIAL APPLICABILITY

The present invention is useful for a plasma display device with high quality of image display, which is capable of causing address discharge stably even in a panel having a larger screen and a higher resolution, and a method for driving a panel.

The invention claimed is:

1. A plasma display device comprising:

a plasma display panel including a plurality of discharge cells, each having a display electrode pair composed of a scan electrode and a sustain electrode;

a scan electrode drive circuit for driving the scan electrode by generating a decreasing downward inclined waveform voltage in an initializing period of the plurality of subfields in one field period, each of the subfields having the initialization period, an address period and a sustain period, and by generating an increasing first inclined waveform voltage in the initializing period of at least one subfield in the one field period; and a panel temperature detecting circuit having a thermal sensor and detecting a temperature of the plasma display panel;

wherein the scan electrode drive circuit switches a lowest voltage in the downward inclined waveform voltage at a first voltage, a second voltage having a higher voltage value than the first voltage and a third voltage having a higher voltage value than the second voltage to generate the downward inclined waveform voltage;

sets the lowest voltage in the downward inclined waveform voltage at the second voltage in a subfield in which the increasing first inclined waveform voltage is generated independent of the temperature detected by the panel temperature detecting circuit; and sets the lowest voltage in the downward inclined waveform voltage in a subfield in which the increasing first inclined waveform voltage is not generated:

a) at the first voltage when the detected temperature is in a low temperature range, b) at the third voltage in a subfield just after a subfield in which a total number of the sustain pulses generated in the sustain period is not less than a predetermined number, when the detected temperature is in a high temperature range.

2. The plasma display device of claim 1, wherein the panel temperature detecting circuit compares the detected temperature with a predetermined low-temperature threshold value and a predetermined high-temperature threshold value, the panel temperature detecting circuit judges that the detected temperature is in the high temperature range when the detected temperature is not less than the high-temperature threshold value;

the panel temperature detecting circuit judges that the detected temperature is in the low temperature range when the detected temperature is less than the low-temperature threshold value; and the scan electrode drive circuit sets the lowest voltage to the second voltage and generates the downward inclined waveform voltage when the detected temperature is not less than the low-temperature threshold value and less than the high-temperature threshold value.

3. A method for driving a plasma display panel that has a plurality of discharge cells including a display electrode pair composed of a scan electrode and a sustain electrode, the method comprising:

providing a plurality of subfields in one field period, each subfield including an initializing period, an address period and a sustain period;

applying a decreasing downward inclined waveform voltage to the scan electrode in the initializing period, and applying an increasing first inclined waveform voltage to the scan electrode in the initializing period of at least one subfield in the one field period;

detecting a temperature of the plasma display panel by using a thermal sensor, and switching a lowest voltage in the downward inclined waveform voltage at a first voltage, a second voltage having a higher voltage value than the first voltage and a third voltage having a higher voltage value than the second voltage according to the detected temperature;

setting the lowest voltage in the downward inclined waveform voltage at the second voltage in a subfield in which the increasing first inclined waveform voltage is generated, independent of the detected temperature; and setting the lowest voltage in the downward inclined waveform voltage in a subfield in which the increasing first inclined waveform voltage is not generated:

a) at the first voltage when the detected temperature is in a low temperature range, b) at the third voltage in a subfield just after a subfield in which a total number of the sustain pulses generated in the sustain period is not less than a predetermined number, when the detected temperature is in a high temperature range.

4. The method for driving a plasma display panel of claim 3, wherein the detected temperature is compared with a predetermined low-temperature threshold value and a high-temperature threshold value, the detected temperature is judged as the high temperature range when the detected temperature is not less than the high-temperature threshold value;

the detected temperature is judged as the low temperature range when the detected temperature is less than the low-temperature threshold value; and the lowest voltage is set to the second voltage when the detected temperature is not less than the low-temperature threshold value and less than the high-temperature threshold value.

* * * * *